(12) United States Patent
Forgey

(10) Patent No.: US 10,629,103 B2
(45) Date of Patent: *Apr. 21, 2020

(54) SYSTEMS AND METHODS FOR LUMINESCENT DISPLAY

(71) Applicant: Light Bohrd, LLC, Round Rock, TX (US)

(72) Inventor: Christian Forgey, Round Rock, TX (US)

(73) Assignee: Light Bohrd, LLC, Round Rock, TX (US)

( * ) Notice: Subject to any disclaimer, the term of this patent is extended or adjusted under 35 U.S.C. 154(b) by 230 days.

This patent is subject to a terminal disclaimer.

(21) Appl. No.: 14/560,291

(22) Filed: Dec. 4, 2014

(65) Prior Publication Data

US 2015/0195890 A1   Jul. 9, 2015

Related U.S. Application Data

(63) Continuation-in-part of application No. 13/804,187, filed on Mar. 14, 2013, now abandoned, which is a
(Continued)

(51) Int. Cl.
*H05B 37/02* (2006.01)
*G09F 13/18* (2006.01)
(Continued)

(52) U.S. Cl.
CPC .............. *G09F 13/18* (2013.01); *G09F 13/22* (2013.01); *G09G 3/16* (2013.01); *H05B 33/0857* (2013.01); *H05B 37/029* (2013.01); *Y02B 20/341* (2013.01)

(58) Field of Classification Search
None
See application file for complete search history.

(56) References Cited

U.S. PATENT DOCUMENTS

| 4,319,308 A | 3/1982 | Ippoliti et al. |
| 4,769,629 A | 9/1988 | Tigwell |

(Continued)

FOREIGN PATENT DOCUMENTS

| FR | 2806288 A1 | 9/2001 |
| GB | 2494917 A | 9/2011 |

(Continued)

*Primary Examiner* — Elmito Breval
(74) *Attorney, Agent, or Firm* — The Noblitt Group, PLLC

(57) ABSTRACT

A ruggedized luminescent display system for displaying electronic images or light from a surface of an object, such as a boardsport medium, helmet medium, article of clothing, or protective clothing medium, for visibility enhancement. According to various aspects of the present technology, the object may comprise a resilient transmissive material disposed within a cavity of the object and may have a surface that is configured to be substantially flush with an outer surface of the object. A light source may be disposed within the object and may emit light through the resilient transmissive material such that the light may be visible from the outer surface of the object. The light source may be electrically coupled to an integrated circuit board with a control system comprising a microcontroller that may control the emission of light from the light source in response to a signal. The microcontroller may receive the signal from a motion sensor that may be electrically coupled to the integrated circuit board and configured to detect the motion of the object. The luminescent display system may be configured to indicate at least one or more of location, distance, direction and/or speed. The luminescent display system may be configured to illuminate environmental surroundings.

23 Claims, 19 Drawing Sheets

Related U.S. Application Data continuation-in-part of application No. 13/163,238, filed on Jun. 17, 2011, now abandoned.

(60) Provisional application No. 61/911,595, filed on Dec. 4, 2013, provisional application No. 61/355,799, filed on Jun. 17, 2010.

(51) Int. Cl.
  *G09F 13/22* (2006.01)
  *G09G 3/16* (2006.01)
  *H05B 33/08* (2020.01)

(56) References Cited

U.S. PATENT DOCUMENTS

| | | | |
|---|---|---|---|
| 5,327,587 A | 7/1994 | Hurwitz | |
| 5,416,675 A | 5/1995 | DeBeaux | |
| 5,426,792 A | 6/1995 | Murasko | |
| 5,500,635 A | 3/1996 | Mott | |
| 5,559,680 A | 9/1996 | Tabanera | |
| 5,683,164 A | 11/1997 | Chien | |
| 5,743,621 A | 4/1998 | Mantha et al. | |
| 5,810,467 A | 9/1998 | Hurwitz | |
| 6,007,213 A | 12/1999 | Baumgartner | |
| 6,012,822 A * | 1/2000 | Robinson | A43B 1/0036 315/200 A |
| 6,030,089 A * | 2/2000 | Parker | A43B 3/0021 36/136 |
| 6,266,623 B1 | 7/2001 | Vock | |
| 6,309,764 B1 | 10/2001 | Burrows | |
| 6,348,859 B1 | 2/2002 | Baker | |
| 6,497,493 B1 | 12/2002 | Theisen | |
| 6,784,795 B1 | 8/2004 | Pories | |
| 6,802,636 B1 * | 10/2004 | Bailey, Jr. | A63C 17/01 280/841 |
| 7,054,784 B2 | 5/2006 | Flentov et al. | |
| 7,121,676 B1 | 10/2006 | Kutnyak | |
| 7,221,263 B2 | 5/2007 | Moore et al. | |
| 7,232,246 B2 | 6/2007 | Kleber et al. | |
| 7,460,050 B2 | 12/2008 | Alvarado et al. | |
| 7,512,515 B2 | 3/2009 | Vock et al. | |
| 7,695,156 B2 | 4/2010 | Hurwitz | |
| 7,932,820 B2 | 4/2011 | Hurwitz | |
| 8,814,403 B2 * | 8/2014 | Khan | F21V 33/008 362/183 |
| 2002/0155214 A1 | 10/2002 | Murasko et al. | |
| 2002/0157173 A1 | 10/2002 | Murasko et al. | |
| 2004/0008106 A1 | 1/2004 | Konczal | |
| 2004/0240198 A1 | 12/2004 | Van Laar et al. | |
| 2005/0134191 A1 * | 6/2005 | Wong | A43B 1/0036 315/200 A |
| 2005/0207138 A1 * | 9/2005 | Cheung | A43B 1/0027 362/84 |
| 2006/0207138 A1 | 9/2006 | Yuen | |
| 2007/0002557 A1 | 1/2007 | Golle et al. | |
| 2007/0041193 A1 * | 2/2007 | Wong | A43B 3/0005 362/276 |
| 2007/0247296 A1 | 3/2007 | Moore et al. | |
| 2007/0194558 A1 | 8/2007 | Stone | |
| 2007/0208530 A1 | 9/2007 | Vock et al. | |
| 2008/0019119 A1 * | 1/2008 | Marston | A43B 1/0036 362/103 |
| 2008/0218996 A1 | 2/2008 | Galloway et al. | |
| 2008/0300055 A1 | 12/2008 | Lutnick et al. | |
| 2009/0003014 A1 | 1/2009 | Jablonski | |
| 2009/0021365 A1 | 1/2009 | Hurwitz | |
| 2009/0034238 A1 | 2/2009 | Hurwitz | |
| 2009/0056189 A1 | 3/2009 | Lu | |
| 2009/0066073 A1 | 3/2009 | Kawano | |
| 2009/0193689 A1 | 8/2009 | Galica et al. | |
| 2009/0236811 A1 | 9/2009 | Lewis | |
| 2009/0236841 A1 | 9/2009 | Borges | |
| 2009/0303698 A1 | 12/2009 | Huss et al. | |
| 2010/0066936 A1 | 3/2010 | Garrett | |
| 2010/0251453 A1 | 10/2010 | Chen | |
| 2010/0251492 A1 * | 10/2010 | Cheung | A43B 1/0036 12/146 B |
| 2011/0309772 A1 | 12/2011 | Forgey | |
| 2012/0069552 A1 | 3/2012 | Richter | |
| 2012/0139449 A1 | 6/2012 | Zilber | |
| 2012/0140451 A1 | 6/2012 | Araujo et al. | |
| 2012/0246795 A1 | 10/2012 | Scheffler | |
| 2013/0039088 A1 * | 2/2013 | Khan | F21V 33/008 362/543 |
| 2013/0106603 A1 | 5/2013 | Weast | |
| 2013/0114247 A1 | 5/2013 | Riguad et al. | |
| 2013/0321143 A1 | 5/2013 | Boyer | |
| 2013/0222127 A1 | 8/2013 | Ray Avalani | |

FOREIGN PATENT DOCUMENTS

| | | |
|---|---|---|
| JP | 05-276313 A | 10/1993 |
| JP | 2005110277 A | 4/2005 |
| JP | 2007-296155 | 4/2006 |
| JP | 2007-042319 | 2/2007 |
| KR | 20030031856 A | 4/2003 |
| KR | 10-2005-0100962 A | 10/2005 |
| KR | 10-2007-0083412 A | 8/2007 |
| WO | 1998036213 A1 | 8/1998 |
| WO | 2005058083 A2 | 6/2005 |

\* cited by examiner

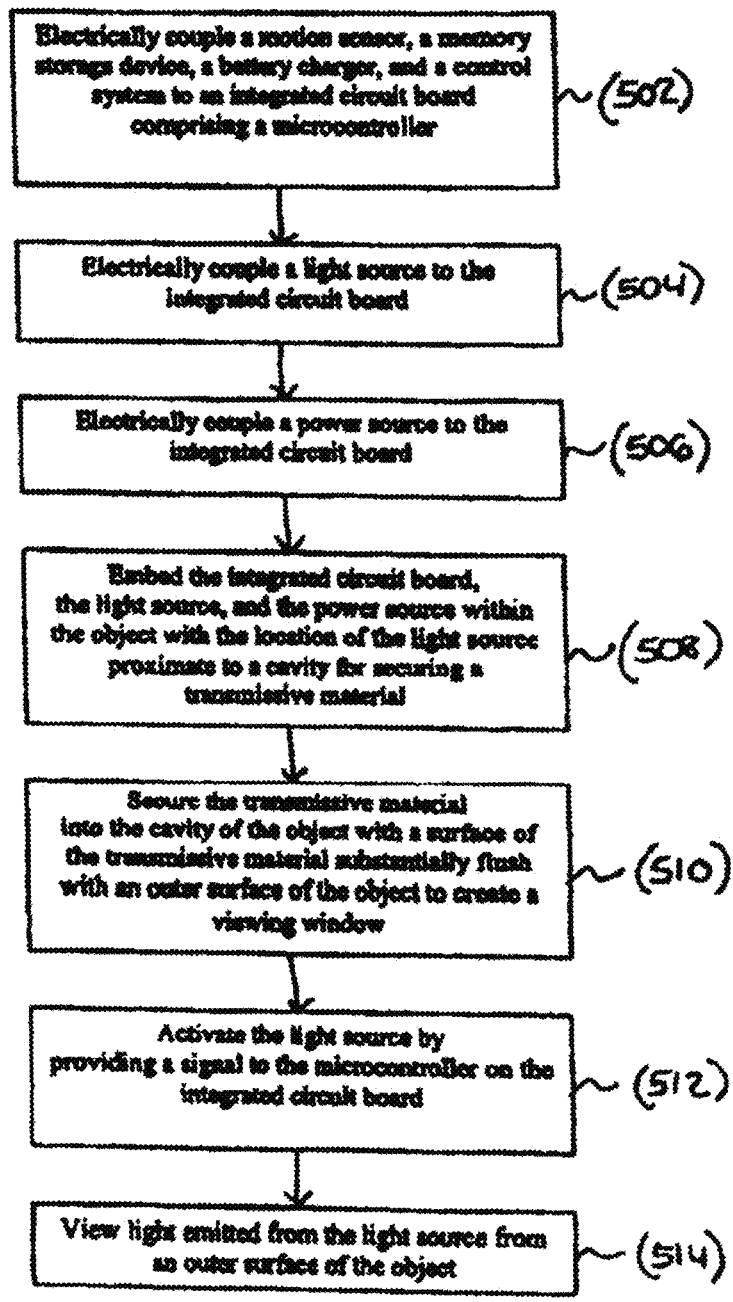

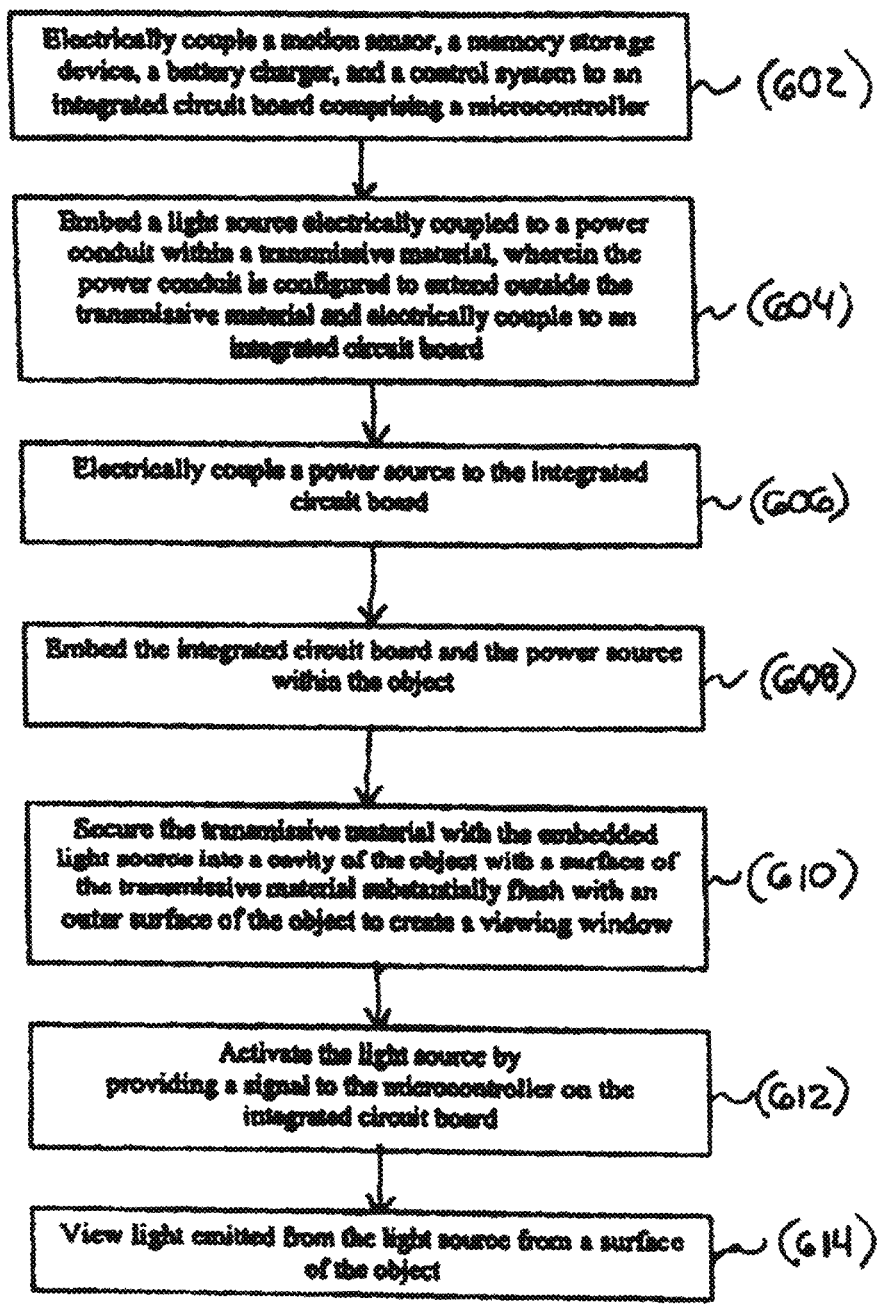

1000    1005

SYSTEMS AND METHODS FOR LUMINESCENT DISPLAY

CROSS REFERENCE TO RELATED APPLICATION

This application claims the benefit of U.S. Provisional Patent Application No. 61/911,595, filed Dec. 4, 2013, and is a continuation in part of U.S. Nonprovisional patent application Ser. No. 13/804,187, filed Mar. 14, 2013, which is a continuation in part of U.S. Nonprovisional patent application Ser. No. 13/163,238, filed Jun. 17, 2011, which claims the benefit of U.S. Provisional Patent Application No. 61/355,799, filed Jun. 17, 2010, and incorporates the disclosure of each application by reference.

BACKGROUND OF INVENTION

Skateboards and snowboards are equipment that may be used in a variety of recreational, sporting, artistic, and transportation activities. Users of these devices may share several commonalities. For example, users may apply a portion of their body to a board while utilizing the equipment. The board used in skateboarding, longboarding or traditional skateboarding, may be referred to as a deck. The board used in snowboarding may include a core or a base. The component materials used during board construction may be chosen to accommodate a specific type of user. Variables such as the user's age, size, skill level, style, and transportation needs may all be determinant factors considered when manufacturing boards.

The market and the cultures of skateboarding and snowboarding are very similar. Both endeavors have a global market, a wide user demographic, and have matured out of early demographic confines. The user demographic includes those who use boards for transportation. Many different genres of boards may be available to accommodate typical users. For example, some common variants may include long boards, acrobatic boards, freestyle boards, and beginner's boards. Boards may comprise safety regulation compliant features such as indicators for visibility, distance, direction and/or speed. Such features may simultaneously operate to provide the user with illumination by revealing the user's environmental surroundings. Additionally, boards may comprise attention grabbing features such as shape, size, material, color, and accessories. Clothing and specifically protective clothing may also utilize indicators for visibility distance, direction and/or speed.

SUMMARY OF THE INVENTION

A ruggedized luminescent display system for displaying electronic images or light from a surface of an object, such as a boardsport medium, helmet medium, protective article, and/or clothing medium for visibility enhancement. According to various aspects of the present technology, the protective article may comprise a resilient transmissive material disposed within the protective article and may have a surface that is configured to be substantially flush with an outer surface of the protective article. A light source may be disposed within the protective article and may emit light through the resilient transmissive material such that the light may be visible from the outer surface of the protective article. The light source may be electrically coupled to an integrated circuit board with a control system comprising a microcontroller that may control the emission of light from the light source in response to a signal. The microcontroller may be initially activated by the user by an embedded switch. Once the microcontroller is activated, the microcontroller may receive the signal from a motion sensor that may be electrically coupled to the integrated circuit board and configured to detect the motion of the protective article. The luminescent display system may be configured to indicate at least one or more of location, distance, direction and/or speed. The luminescent display system may be configured to illuminate environmental surroundings.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

FIG. 5 is a flow chart that representatively illustrates an exemplary method of manufacture of a luminescent display system where a light source is separate from a transmissive material;

FIG. 6 is a flow chart that representatively illustrates an exemplary method of manufacture of a luminescent display system where a light source is embedded within a transmissive material;

Figure 1A:
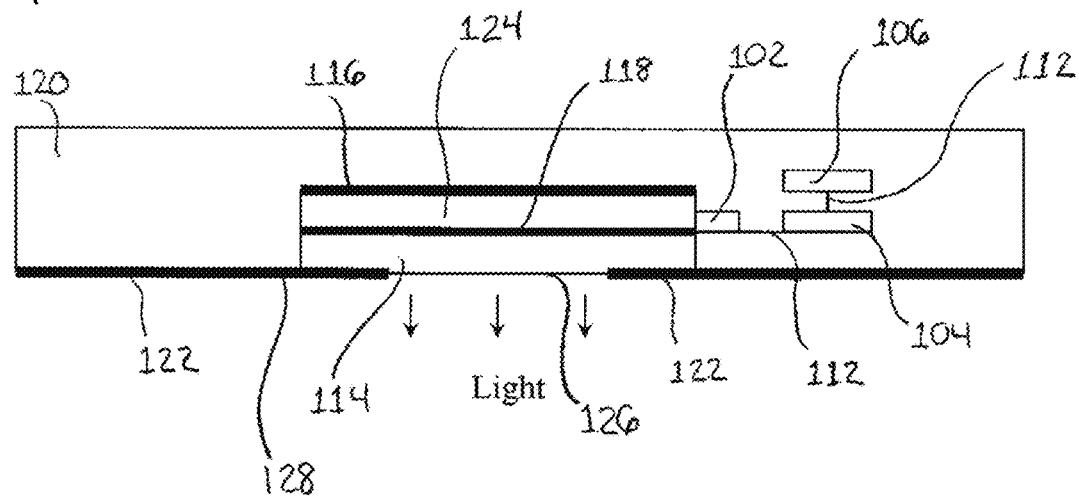
FIG. 1A-1B representatively illustrate a cross-sectional view of an exemplary embodiment of a luminescent display system coupled to an object wherein a light source is located proximate to a transmissive material.

Elements and steps in the figures are illustrated for simplicity and clarity and have not necessarily been rendered according to any particular sequence or scale. For example, steps that may be performed concurrently or in different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various process steps, apparatus, systems, methods, etc. In addition, the present invention may be practiced in conjunction with any number of systems and methods for providing luminescence at a surface of an object, and the system described is merely one exemplary application for the technology. Further, the present technology may employ any number of conventional techniques for implementing luminescence at the surface of the object.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

Various representative implementations of the present technology may be applied to any system or method for providing a luminescent display system configured to display electronic images or light from the surface of an object. The object may comprise any suitable medium for containing and supporting the luminescent display system. For example, the object may be a boardsport medium, such as a skateboard, snowboard, surfboard, wakeboard, ski, paddle board, bodyboard, and the like. The object may also comprise a protective article, such as body protective clothing, including helmets, chest protectors, jackets for running, biking, off-road and street motorcycle riding, law enforcement apparel, construction worker apparel, airport worker apparel, and the like. The object may also comprise a scuba apparel, wet suits, pet apparel, equine saddles, shoes, exercise clothing. The object may comprise a patch or sticker that can be applied to the object, including various types of protective articles, clothing, or helmets, as described above.

In an exemplary embodiment, according to various aspects of the present technology, the luminescent display system may be coupled to the object in a configuration that seals the components of the luminescent display system within the object and allows light emitted from the luminescent display system to be visible from an outer surface of the object. The components of the luminescent display system may be placed in any suitable location in the object to optimize their conditions for use. For example, any component may be placed at the top, bottom, center, front, back, or near a structurally reinforced portion of the object, such as near the trucks of a skateboard. In one embodiment, one or more components of the luminescent display system may occupy a sealed cavity within the object wherein light may be visible through an acrylic sealed window. The cavity may be created during manufacturing of the object. In another embodiment, the components of the luminescent display system may be incorporated into the object by any suitable method, such as being pressed between layers of component material of the object.

In an exemplary embodiment, according to various aspects of the present technology, the luminescent display system may be coupled to a protective article in a configuration that seals the components of the luminescent display system within the protective article and allows light emitted from the luminescent display system to be visible from an outer surface of the protective article. The components of the luminescent display system may be placed in any suitable location in the protective article to optimize their conditions for use. For example, any component may be placed at the top, bottom, center, front, back, or near a structurally reinforced portion of the protective article. In one embodiment, one or more components of the luminescent display system may occupy a sealed cavity within the protective article wherein light may be visible through an acrylic sealed window. The cavity may be created during manufacturing of the protective article. In another embodiment, the components of the luminescent display system may be incorporated into the protective article by any suitable method, such as being pressed between layers of component material of the protective article.

In one embodiment, the luminescent display system may comprise a fixed luminescent display that the user can turn off and/or on. In another embodiment, the luminescent display system may comprise a programmable display that the user may control. In yet another embodiment, the luminescent display system may display electronic images or light in response to a signal, such as from a motion sensor detecting the motion of the object. The luminescent display may display electronic images or light from one, multiple, or all surfaces of the object.

The components of the luminescent display system may be coupled to the object in any suitable arrangement. For example, the components may be provided separately for mounting each component to a different location within the object such as for strategically placing each component in a location that may protect that component from shock, breakage, or excessive wear. In one embodiment, the components of the luminescent display system may be integrated into a pre-assembled module that may be attached to one or several layers, sandwiched between several layers of component material of the object or in a cavity of the object.

The luminescent display system may be configured to be ruggedized to resist wear and damage from the physical stress of the environment and harsh conditions during use. For example, the luminescent display system may be used in environmental conditions that may be extreme in temperature, humidity, precipitation such as snow, sleet, or rain, and corrosive salinity such as salt water. Further, the user may subject the luminescent display system to physically stressful impact forces such as direct blunt forces, forces from the impact of a sharp object, bending, twisting, and the like.

In one embodiment, the luminescent display system may be placed within one or more cavities of the object or between layers of the object such that the components are protected from exposure to the environment. In another embodiment, the components of the luminescent display system may themselves comprise materials that resist wear. For example, the components may thin or flexible to enhance durability.

Referring now to FIGS. 1A-1B and 2A-2B, systems and methods for providing the luminescent display system according to various aspects of the present technology may be representatively illustrated by a luminescent display system 100. In some embodiments, the luminescent display system 100 may comprise a light source 102, an integrated circuit board 104, a power source 106, and one or more power conduits 112.

The integrated circuit board 104 may comprise any printed circuit board that may be a substrate, which may mechanically and electrically support electronic components. In one embodiment, the electronic components may be printed directly onto the integrated circuit board 104. In another embodiment, the integrated circuit board 104 may comprise connection points for electronic components. In yet another embodiment, the integrated circuit board 104 may comprise both directly attached electronic components and connection points for electronic components.

Figure 3:
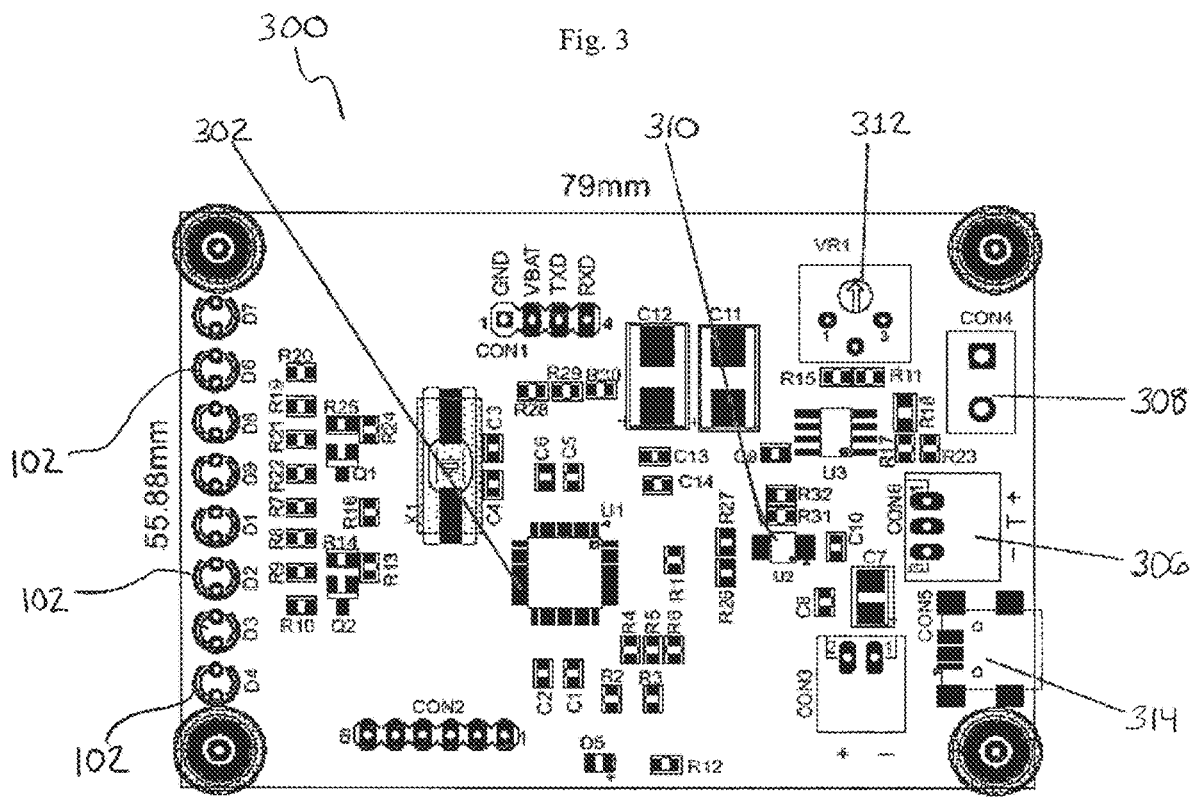
FIG. 3 representatively illustrates a schematic of an exemplary embodiment of an integrated circuit board.

Referring to FIG. 3, in an exemplary embodiment of the present technology, the integrated circuit board 104 may be an integrated circuit board 300. One or more electronic components may be electrically coupled directly onto the integrated circuit board 300, by conventional processes such as soldering or using wire connectors. In another embodiment, one or more electronic components may be located apart from the integrated circuit board 300 and may be electrically coupled to the integrated circuit board 300 by the power conduit 112. In one embodiment, the integrated circuit board 300 may be a flexible circuit board encapsulated in polyimide material to provide for flexibility of the assembly.

In an exemplary embodiment, according to various aspects of the present technology, the integrated circuit board 300 may comprise a microcontroller 302, a battery charger 310, a motion sensor 312, a USB charger 314, and a battery connector 306. The microcontroller 302, battery charger 310, motion sensor 312, USB charger 314, and the battery connector 306 may be directly electrically coupled to the integrated circuit board 300. The USB charger 314 may comprise a direct USB connector and/or a micro USB connector as will be discussed in detail below. In one embodiment, the integrated circuit board 300 may comprise one or more directly electrically coupled light sources 102, a piezoelectric transducer 308, and a magnetic induction circuit (not shown). In another embodiment, the light source 102, the piezoelectric transducer 308, and the magnetic induction circuit may be located remotely from the integrated circuit board 300 and be electrically coupled to the integrated circuit board 300 by the power conduit 112 (not shown). Further, in another embodiment, the integrated circuit board 300 may comprise a power source connector 306 for electrically coupling a remotely located power source 106 to the integrated circuit board 300 via the power conduit 112.

The integrated circuit board 300 may be incorporated into any suitable location in the object 120. As shown in FIGS. 1A-1B and 2A-2B, the integrated circuit board 104 may be embedded within the object 120. For example, the object 120 may be a skateboard deck or a snowboard base, wherein the integrated circuit board 104 may be disposed between two layers of component material during the manufacturing process for creating the skateboard deck or snowboard base, as detailed below. In one embodiment, the integrated circuit board 104 may be located in the head or tail section of the skateboard deck or snowboard base, wherein the power conduit 112 extends from the integrated circuit board 104 to the light source 102 and/or the power source 106 that may be placed in other locations throughout the object 120.

In one embodiment, the integrated circuit board 104 may comprise a control system comprising a microcontroller 302 for controlling various functions of components of the luminescent display system 100. The microcontroller 302 may comprise any suitable electronic components such as memory, drivers, a clock, a microprocessor, and the like. For example, the microcontroller 302 may control component functions according to local signals from a nearby sensor, such as the motion sensor 312, and/or the microcontroller 302 may be adapted to control component functions according to communications from remote systems. The microcontroller 302 may also comprise a programmable microcontroller or CPU that may process and transmit instructions to the luminescent display system 100 after a user uploads data from an interface such as a computer. The microcontroller 302 may be configured to transmit, receive, and/or exchange data through any system for exchanging data, such as, for example, the Internet, an intranet, an extranet, Wide Area Network ("WAN"), Local Area Network ("LAN"), WIFI, WIMAX, satellite communications, intermediate storage systems, radio frequency communications, a mesh network protocol such as Zigbee, wireless 802.11g, a wireless technology standard for exchanging data over short distances, such as a bluetooth and/or the like. In one embodiment, the user may upload a program or instruction for controlling the light source 102 wirelessly to the microcontroller 302, such as through a wireless Internet connection.

The microcontroller 302 may process the signal to control the light source 102. The microcontroller 302 may activate the light source 102 to emit a desired color and/or pattern of light, such as playing a video, blinking, displaying pictures and/or text, and the like.

The microcontroller 302 may also communicate with other components, such as the power source 106. The microcontroller 302 may receive a signal from the power source 106 that the amount of charge is sufficient for operating the luminescent display system 100, which may prevent the microcontroller 302 from activating the power source charger 310. The microcontroller 302 may also receive a signal from the power source 106 that the amount of charge is insufficient for operating the luminescent display system 100, which may result in the microcontroller 302 activating the power source charger 310 to charge the power source 106.

The microcontroller 302 may comprise at least one of a switch, memory device, microcontroller, chip, antennae, and/or communication port such as a USB. The memory device may be embedded or non-embedded technology that may be volatile or non-volatile, such as random access memory or a read only memory that may deliver instructions for the control of the luminescent display system 100. Certain embodiments of the microcontroller 302 may include removable memory devices such as cards, sticks, discs, or other storage devices. The microcontroller 302 may comprise any memory storage device known to one skilled in the art either now existing and/or hereinafter produced, developed, and/or implemented in the future.

In one embodiment, the microcontroller 302 may comprise a switch. The switch may comprise a button, a touch sensitive pad, a hall effect sensor, antennae, port, or any other device that may facilitate communication of information between a user and the luminescent display system 100. In one embodiment, the microcontroller 302 may comprise multiple representative elements that work alone or together to activate, deactivate, or impose instructions upon the luminescent display system 100. Representative embodiments may comprise an on/off switch connected to a central processing unit (CPU) that may control any component of the luminescent display system 100. In another embodiment, the microcontroller 302 may comprise a simple on/off touch pad and/or a radio-frequency identification (RFID) antennae that may activate and deactivate the luminescent display system 100 when the object 120 is grasped by a user or exposed to a user's RFID signal. In another embodiment, the microcontroller 302 may comprise a hall effect sensor, which may detect a change in the magnetic field, whereby a user may utilize a magnet to control the luminescent display system 100. In another embodiment, the microcontroller 302 may comprise a capacitive touch sensor to control the luminescent display system 100.

The microcontroller 302 may be electrically coupled to the power source 106 through the integrated circuit board 300 by the power conduit 112 such that the power source 106 provides electricity to drive the microcontroller 302. In one embodiment, the microcontroller 302 may be directly electrically coupled onto the integrated circuit board 104.

In one embodiment, the microcontroller 302 may activate or deactivate the light source 102 in response to the motion of the object 120. For example, the motion sensor 108, a micro electric mechanical chip, or other suitable device may sense the environment around the object 120 and provide a signal to the microcontroller 302. Certain representative embodiments of the microcontroller 302 may gather optical, kinetic, thermal, or other information surrounding the object 120 and may provide the signal to the microcontroller 302 based on the information. The microcontroller 302 may activate or deactivate the light source 102 in response to the signal.

In one embodiment, the motion sensor 108, may comprise a device such as an accelerometer that may quantify the proper acceleration of the object 120 such as by measuring the specific force or g-force of the object 120. For example, the object 120 may be a skateboard in which a user rides over a surface such as the ground, rough terrain, and/or over jumps for performing tricks. The accelerometer may measure the acceleration of the skateboard over the surface as the skateboard reaches higher speeds and, in turn, provide a signal to the microcontroller 302 to activate or deactivate the light source 102 based on that signal. In another exemplary embodiment, the motion sensor 108 may comprise a piezoelectric transducer that may convert the application of pressure, acceleration, or force to an electrical charge that is detected by the microcontroller 302.

Figure 1B:
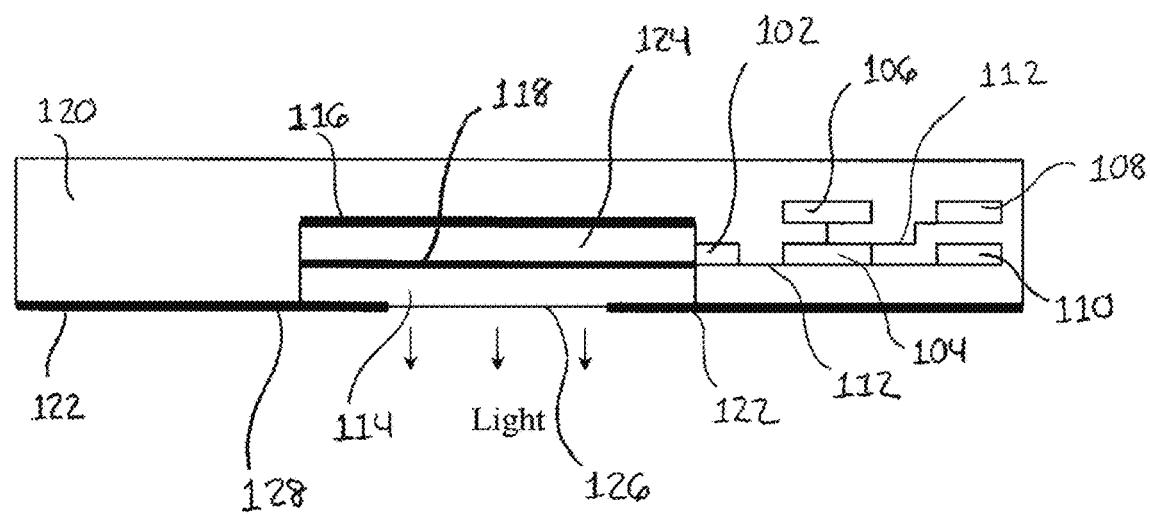
Figure 2A:
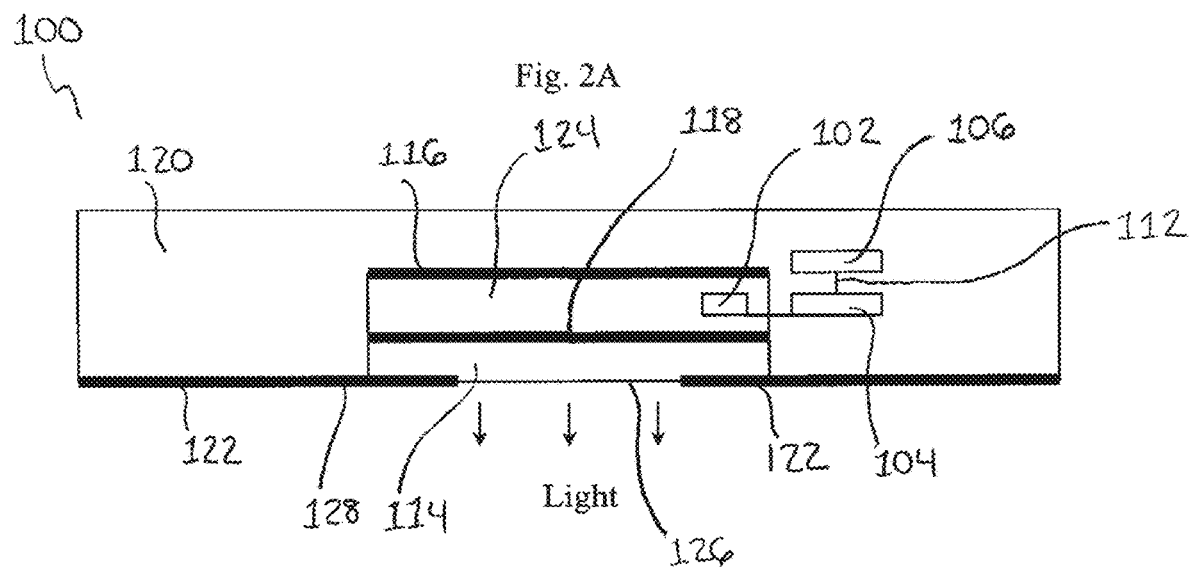
FIGS. 2A-2B representatively illustrate a cross-sectional view of an exemplary embodiment of a luminescent display system coupled to an object wherein a light source is embedded in a transmissive material.

In one embodiment, referring to FIGS. 1A and 2A, the motion sensor 108 may be electrically coupled directly onto the integrated circuit board 104, such as the motion sensor 312 shown in FIG. 3. In another embodiment, referring to FIGS. 1B and 2B, the motion sensor 108 may be independent of and electrically coupled to the integrated circuit board 104. The motion sensor 108 that is apart from the integrated circuit board 104 may therefore be located in another portion of the object 120.

The light source 102 may comprise any suitable structure and/or device that may emit light, such as at least one light emitting diode (LED), organic light emitting diode, light emitting electrochemical cell, quantum dot, thick-film dielectric technology, or micro-display. In one embodiment, the light source 102 may be electrically coupled to the microcontroller 302 through the power conduit 112 such that the power source 106 may provide electricity to drive the light source 102. In another embodiment, the light source 102 may be directly electrically coupled to the microcontroller 302 such as by an electrical wire connector and/or a soldered connection.

In an exemplary embodiment, the light source 102 may comprise any suitable LED, such as a red-green-blue LED and/or a phosphor converted LED. The light source 102 may be configured to emit any wavelength of light. In one embodiment, the LED may comprise gallium-based crystals such as gallium nitride, indium gallium nitride, gallium aluminum phosphide, and the like.

In another representative embodiment of the luminescent display system 100, the light source 102 may comprise a thick film dielectric luminescent technology (TDEL). In one embodiment, the TDEL may comprise a phosphor display that combines thick film and thin film technology. In another embodiment, the TDEL may be a light source 102 that is sandwiched between materials and/or films that may be transmissive or opaque. The TDEL may comprise any materials that are highly resistant to temperature extremes and breakage that may result from kinetic impact.

In some embodiments, the light source 102 may comprise an organic light emitting diode (OLED). The light source 102 may comprise any suitable OLED, such as an active or a passive matrix OLED. In one embodiment, an active matrix OLED may provide a low power, rollable display that may attach to any object 120. In some embodiments, the light source 102 may also comprise a passive matrix OLED alternative that is configured for displays requiring less malleability. In another embodiment the OLED may be a phosphorescent OLED that may be an energy efficient light source.

In some embodiments, the light source 102 may comprise a light emitting electrochemical cell (LEC) that may achieve luminescence with an organic phosphorescent display. Further, the LECs may have slower turn on times that may be suitable for providing static luminescence when applied at the surface of the object 120. In one embodiment, the LEC may comprise at least one of graphene, gold, a blended carbon nanotube, and a polymer light emitting diode. In some embodiments, the light source 102 may comprise the LEC that may be implemented on a printed film that may be attached to the object 120.

In one embodiment, the light source 102 may comprise one or more quantum dots. A possible variant using quantum dot technology may comprise a light source 102 that responds to external stimulus such as voltage or light. In another embodiment, quantum dot technology may be combined in a low power film that may be a rechargeable power source such as a photovoltaic cell. Some embodiments of a quantum dot light source 102 may emit white light, or the quantum dots may produce red, green, or blue light, or any another electromagnetic wavelength.

In one embodiment, the light source 102 may comprise may comprise a fiber optic cable. The fiber optic cable may be located in a channel. The fiber optic cable may also be bent to create a "hot spot" of light, thereby increasing the illumination of the light source 102, as will be discussed in further detail below.

Representative embodiments of the light source 102 may comprise any LED, TDEL, OLED, LEC, fiber optic medium, flexible light guides, and/or quantum dot technology known to one skilled in the art either now existing and/or hereinafter produced, developed, and/or implemented in the future.

Referring to FIGS. 1A and 1B, the light source 102 may be located proximate to the transmissive material 114 and configured to emit light through the transmissive material 114. For example, in an exemplary embodiment, one or more light sources 102 may be located directly adjacent to the transmissive material 114, wherein the power conduit 112 extends from the light source 102 to the power source 106 and/or the integrated circuit board 104 which may be in other locations throughout the object 120. The light source 102 may be embedded within the object 120. For example, the object 120 may be a skateboard deck or a snowboard base, wherein the light source 102 may be disposed between two layers of component material during the manufacturing process for creating the skateboard deck or snowboard base, as detailed below.

Figure 2B:
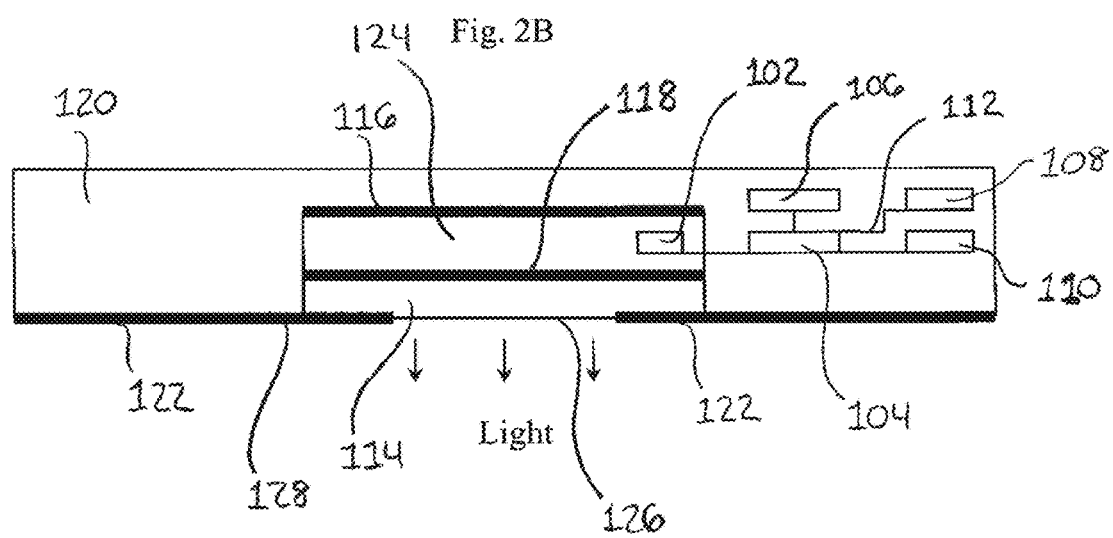

Referring to FIGS. 2A and 2B, the light source 102 may be embedded in the transmissive material 114. For example, the light source 102 may be electrically coupled to the power conduit 112, which may extend from the light source 102 to the power source 106 and/or the integrated circuit board 104. In an exemplary embodiment of the present technology, the light source 102 that may be electrically coupled to the power conduit 112 may be embedded in the transmissive material 114 during a manufacturing process of the transmissive material 114, such as curing and/or molding processes.

The luminescent display system 100 may comprise a power source 106. The power source 106 may comprise any suitable structure and/or device that may provide power. For example, in various embodiments of the present technology, the power source 106 may comprise a battery such as an energy harvesting battery, a rechargeable battery, a nanowire cell, a solar cell, thin film cell, a lithium polymer battery, a super capacitor, button or coin cells, an alkaline battery, multiple electrode cells, energy harvesting transducers, and/or solid state rechargeable thin-film micro-energy storage devices.

The power source 106 may also comprise and/or be coupled to a solar cell. In some embodiments, the solar cell may provide power directly or indirectly to the luminescent display system 100, and/or it may be attached to an electrical storage medium, such as a battery. In various embodiments, the solar cell may comprise thin film technology, organic, polymer, and/or silicon-based cells.

In some embodiments, the power source 106 may comprise a device that produces electrical energy via changes in acceleration or motion, such as an energy harvesting transducer. In one embodiment, the power source 106 may derive power from a power production mechanism attached to accessories associated with the object, such as a skateboard. For example, the power source 106 may derive power from a power generator that may use the rotational energy associated with wheels attached to the skateboard. The power source 106 may comprise any battery, electrical storage device, and/or electrical production device known to one skilled in the art either now existing and/or hereinafter produced, developed, and/or implemented in the future.

As shown in FIGS. 1A-1B and 2A-2B, the power source 106 may be electrically coupled to the power conduit 112, which may conduct electricity from the power source 106 to drive the light source 102 and/or the components of the integrated circuit board 300. In one embodiment, the battery may be removable or connected to any component of the luminescent display system 100 in a semi-permanent or permanent configuration.

The power source 106 may comprise a battery that is substantially resistant to wear from physical and environmental stress, such as the force from an impact or exposure to extreme temperatures. In an exemplary embodiment, the battery may comprise a substantially flexible lithium polymer pouch cell battery that may be incorporated into the object 120 at a location that is protected from wear. For example, where the object 120 is a skateboard, the battery may be located in the tail section of the skateboard and/or near the wheel base or trucks.

In one embodiment, the power source 106 may be configured to be rechargeable by any suitable method such as a conventional direct electrical connection to a recharge circuit or indirect recharging methods. For example, in one embodiment, the power source 106 may be indirectly recharged by electromagnetic induction in which a magnetic field is used to wirelessly induce a current into a receiving coil with a magnetic induction circuit 110 that is connected to the power source 106. In one embodiment, as shown in FIGS. 1B and 2B, the magnetic induction circuit 110 may be separate from and electrically coupled to the integrated circuit board 104. In another embodiment, the magnetic induction circuit 110 may be electrically coupled directly on the integrated circuit board 104 (not shown).

In an exemplary embodiment, the magnetic induction circuit 110 may be a Powermat® receiver incorporated into the object 120 and electrically coupled to the integrated circuit board 104 through the power conduit 112. The magnetic field may be provided by the Powermat® mat. In another embodiment, the power source 106 may be indirectly recharged by harvesting energy from the environment such as with a piezoelectric transducer that may be electrically coupled to the integrated circuit board 104.

Referring to FIGS. 1A-1B and 2A-2B, the power source 106 may be electrically coupled to the integrated circuit board 104 by a power conduit 112. The power source 106 may be embedded within the object 120 in any suitable location. For example, the power source 106 may be located on the top of the object 120, such as where the power source 106 requires solar energy for recharging. In one embodiment, the object 120 may be a skateboard deck or a snowboard base, wherein the power source 106 may be disposed between two layers of component material during the manufacturing process for creating the skateboard deck or snowboard base, as detailed below. In an exemplary embodiment of the present technology, the power source 106 may be located in the tail section of the skateboard deck proximate to the integrated circuit board 104.

The power conduit 112 may be electrically coupled to the power source 106 to provide power to the light source 102 and the integrated circuit board 104. The power conduit 112 may comprise any material that may convey power such as electricity. For example, the power conduit 112 may comprise a solid or stranded wire, a conductor, a thick film dielectric technology, a flexible electronic substrate, and/or a printed circuit board, a thick film, printed, organic, inorganic electronic technology, and/or stretchable or flexible substrates for attachment and conduction. In some embodiments, the power conduit 112 may comprise any suitable medium for fixing conducting materials and/or attaching components of the luminescent display system 100.

In one embodiment, the power conduit 112 may comprise at least one wire. In some embodiments, the wire may comprise any conducting material such as solid wire and/or stranded wire. In a representative embodiment, the power conduit 112 may comprise a multiwire board, with solid or stranded wire embedded in a plastic resin. In some embodiments, the power conduit 112 may be permanently attached to any component of the luminescent display system 100 or it may be removable and/or interchangeable. The power conduit 112 may also be configured to allow the attachment of any component of the luminescent display system 100.

The transmissive material 114 may comprise any suitable material that may fully or partially transmit visible light. For example, the transmissive material 114 may transmit light emitted from the light source 102. In one embodiment, the transmissive material 114 may be proximate to the power conduit 112, the light source 102, the power source 106, and/or the integrated circuit board 104. In some embodiments, the transmissive material 114 may comprise acrylic, polycarbonate and/or thermoplastic polymers, a glass material, an elastomer such as a urethane polymer, biaxially-oriented polyethylene terephthalate material such as Mylar®, and/or a composite or non-composite material of synthetic or organic origin. The transmissive material 114 may comprise one or multiple layers of a single material or multiple layers of different materials to achieve any desired resilient properties and/or optical qualities.

In various embodiments, the transmissive material 114 may comprise a fiber optic panel, a fiber optic fabric, or a flexible light guide. In this embodiment the transmissive material 114 may utilize a fiber optic light source. The fiber optic light source may be manipulated to create "hot spots", as will be further discussed below. The fiber optic light source may comprise a single color, multiple colors, blinking lights, strobe lights, and the like. In various embodiments, the fiber optic light source may comprise a LED coupled with a fiber optic panel, a fiber optic fabric, a flexible light guide, and the like.

Further, the transmissive material 114 may comprise any suitable thickness. For example, in an exemplary embodiment of the present technology, the thickness of the transmissive material may range from an edge thickness of approximately 1.27 mm to a thickness of 3 mm.

In one embodiment, the transmissive material 114 may be resistant to shock from an impact and erosion or wear from environmental contaminants such as salt water. In one embodiment, the optical quality of the transmissive material 114 may be resistant to alteration. For example, the transmissive material 114 may comprise a transparent material that may be resistant to scratching and abrasion that may otherwise render portions of the surface of the transmissive material 114 to be opaque, thus obscuring the transmission of light by the light source 102. The transmissive material 114 may be resistant to abrasion from rocks, board slides along rough surfaces such as a sidewalk curb, and hard ice and snow wherein the transmissive material 114 is configured to be on the bottom surface of a skateboard or a snowboard. The resistance of the transmissive material 114 may allow the light emitted from the light source 102 to be transmitted through the transmissive material 114 unimpeded, thereby preserving the optimal optical quality of the transmissive material 114.

Referring to FIGS. 1A-1B and 2A-2B, the transmissive material 114 may be disposed within a cavity 124 of the object 120. The cavity 124 may comprise an aperture created within one or more sides of the object 120 and may be configured to receive the transmissive material 114 which may fill the entire cavity 124. In one embodiment, a surface 126 of the transmissive material 114 may be configured to be positioned substantially flush with an outer surface 128 of the object 120 such that damage from surfaces that the object 120 encounters is further minimized. The outer surface 128 of the object 120 may be at least partially covered with a design element 122. For example, where the object 120 is a skateboard, aligning the transmissive material 114 flush with the outer surface of the skateboard such that the outer surface of the skate board is smooth will prevent shock to the sides of the transmissive material 114, such as from the impact from a boardslide that may otherwise catch an exposed edge of the transmissive material 114. In an exemplary embodiment, the transmissive material 114 may be secured into the cavity of the object 120 during manufacturing of the object 120.

In a representative embodiment of the present technology, the transmissive material 114 may comprise an acrylic material. In one embodiment, the acrylic material may be translucent, opaque, tinted, and/or colored. In another embodiment, the acrylic material may be smooth and/or may have surface texture, such as patterned indentations, that may provide a desired optical property such as enhancing the light output through the transmissive material 114. The acrylic material may provide visual effects when coupled to the light source 102. In an exemplary embodiment, the acrylic transmissive material 114 may comprise a Clarex® cast cell acrylic sheet from Astra Products, Inc. In an exemplary embodiment, the transmissive material 114 may be a flexible acrylic sheet made from Lumitex and selectively etched to control areas of illumination to improve light patterns and emission.

In another embodiment, the transmissive material 114 may comprise polycarbonate or thermoplastic polymers. For example, the polymers may comprise polystyrene, celluloid, polycarbonate, polyethylene, and/or various mixtures of other polymer materials. The polymers may be scratch resistant, strong, durable, and/or stable over a wide range of temperatures.

The transmissive material 114 may comprise composite or non-composite materials such as synthetic or organic materials. The composite or non-composite visual properties of the transmissive material 114 may provide color changes or changes in the opacity or reflective nature of the transmissive material 114. In one embodiment, the composite or non-composite material of synthetic or organic origin may provide durability, reflectiveness, safety, strength, texture, ease of manufacture such as the ability to be machined or molded, and/or ease of disposal.

The transmissive material 114 may be located in any suitable position on the object 120 such that a viewer may see the display of electronic images and/or light from the luminescent display system 100. In one embodiment, referring to FIG. 4A where the object 120 is a skateboard, the transmissive material 114 may create a winding pattern along the underside of the skateboard creating a trail of light 402. In another embodiment, the design element 122 such as a sticker or paint may form a pattern over the transmissive material 114. For example, referring to FIG. 4B, a sticker design of a face with flaming hair may have a transparent mouth and eye portion overlaying the transmissive material 114. The light 402 emitted from the light source 102 may create glowing eyes and a glowing mouth in the design.

In an exemplary embodiment of the present technology, a reflective film 116 may be applied to one or more surfaces of the transmissive material 114 to at least one of enhance, intensify, diffuse, and/or concentrate light emitted from the light source 102 that is transmitted through the transmissive material 114. The reflective film 116 may direct light from the light source 102 in any suitable direction, such as laterally, upwards, or downwards. For example, the reflective film 116 may be applied to the surface of the transmissive material 114 that faces an internal portion of the object 120, such as in a cavity occupied by the transmissive material 114. The light from the light source 102 may reflect off the reflective film 116 to an opposite side of the transmissive material 114 that is substantially flush with an outer surface of the object 120. The reflection of light to the outer surface of the object 120 may intensify the light that is visible from the outer surface of the object 120.

The reflective film 116 may comprise any suitable reflective material. In one embodiment, the reflective film 116 may comprise retroreflective sheeting such as Diamond Grade DG³ Reflective Sheeting Series 4000 manufactured by 3M. The reflective film 116 may be applied to the transmissive material using any suitable methods, such as cutting the reflective film 116 to conform to the size and dimensions of the transmissive material 114 and/or using a pressure-sensitive adhesive or a lamination process to secure the reflective film 116 to the transmissive material 114.

In one embodiment, according to various aspects of the present technology, a prismatic film 118 may be applied to the transmissive material 114. The prismatic film 118 may be configured to maximize the brightness of the light emitted from the light source 102 through the transmissive material 114, such as by increasing the efficiency of backlighting. The prismatic film 118 may reduce the power consumption of the light source 102 and increase the time the power source 106 provides power to the light source 102 without charging, due to the need for less intense light.

The prismatic film 118 may comprise a sheet material that comprises micro-replicated prismatic cone-like structures that may control the exit angle of light from the transmissive material 114. The cone-like structures on the prismatic film 118 may refract light emitted by the light source 102 that reaches the cone-like structure and direct that light towards the outer surface of the object 120 (toward the viewer). The prismatic film 118 may also reflect light that does not reach the cone-like structures backwards to be recycled until the light reaches the cone-like structures and exits at the desired angle. For example, in one embodiment, the prismatic film 118 may comprise Vikuiti Thin Brightness Enhancement Film 90/24 (TBEF) from 3M. In another embodiment, the prismatic film 118 may comprise Vikuiti Transmissive Right Angle Film II (TRAF II) from 3M, which may be configured to redirect light emitted from the side of the transmissive material 114. In another embodiment, TBEF and TRAF II film may be used together as a prismatic film 118.

In one embodiment of the present technology, the prismatic film 118 may be disposed between two layers of the transmissive material 114, as shown in FIGS. 1A-1B and 2A-2B. The light source 102 may emit light toward and through the transmissive material 114, encountering the prismatic film 118, which may enhance the brightness of the light as it exits to the surface of the object 120.

The luminescent display system 100 may be coupled to an object 120 comprising any suitable object, article, device, component material, and/or surface for attachment and/or coupling with the luminescent display system 100. For example, the object 120 may be a wall, building material, board, table, door, wood, plastic, helmet, composite surface, organic surface, synthetic surface, film, and/or resin. In one embodiment, according to various aspects of the present technology, the object 120 may be a boardsport medium such as a skateboard, snowboard, snow or water skis, sleds, kiteboards, bodyboards, wakeboards, or surfboards. In another embodiment, the object 120 may be a protective article such as a helmet, or clothing, such as, a fireman's protective turnout coat or motocross clothing such as an under roost protective deflector or chest and back protectors or any other suitable material or object where a luminescent display system 100 may be contemplated.

Figure 7:
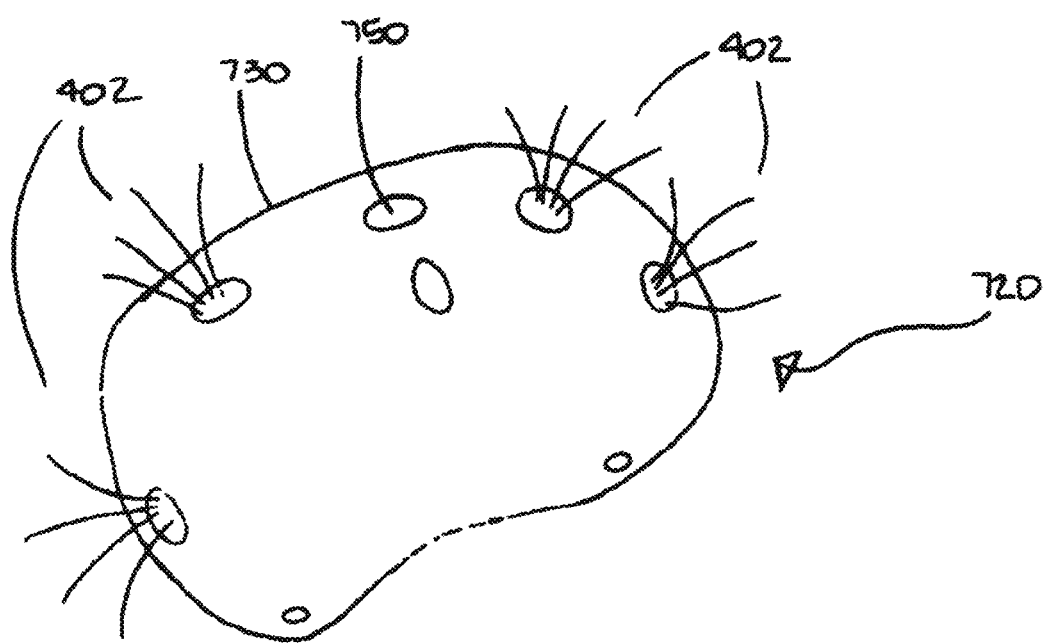
FIG. 7 representatively illustrates an exemplary embodiment of a helmet medium coupled to a luminescent display system where a light source is embedded within a transmissive material.

In one embodiment, according to various aspects of the present technology, as shown in FIG. 7, the object 120 may comprise a helmet 720. The helmet 720 may comprise any conventional helmet for protecting a head of a person such as a sports or motorcycle helmet. In some embodiments, the helmet 720 may comprise an exterior shell 730 and an inner protective core (not shown) coupled to the external shell 730. The exterior shell 730 may comprise any suitable component material such as acrylonitrile butadiene styrene (ABS). The inner protective core of the helmet 720 may comprise any suitable protective and/or cushioning material such as foam. The helmet 720 may have one or more aeration holes 750 for providing air circulation to the head without compromising the protective function of the helmet 720.

The components of the luminescent display system 100 may be coupled to the helmet 720 in any suitable manner such that light 402 emitted from the light source 102 may be viewed from an outer surface of the helmet 720. For example, the one or more light sources 102 may be located at any one or more of the top, front, back, sides, and/or substantially cover the area equal to the area of the exterior shell 730. In various embodiments, in accordance with the present technology, at least one portion of the light source 102 may be embedded in any one or more of the external shell 730 (not shown) and/or the inner protective core. In one embodiment, at least one portion of the light source 102 may be embedded between the exterior shell 730 and the inner protective layer. For example, the light source 102 may be an LED, wherein the LED is in a cavity created in the foam inner protective core of the helmet 720 and configured such that the light source 102 emits light 402 through the one or more aeration holes 750 in the exterior shell 730 of the helmet 720. The helmet 720 and/or the luminescent display system 100 may be ruggedized. The light source 102 may also illuminate a design element 122 as discussed below.

The power source 106 of the helmet 720 may be configured to be rechargeable by any suitable method. In an exemplary embodiment, according to various aspects of the present technology, the power source 106 may be indirectly recharged by electromagnetic induction in which a magnetic field is used to wirelessly induce a current into a receiving coil with a magnetic induction circuit 110 that is connected to the power source. The magnetic induction circuit 110 may be electrically coupled directly onto or be separate from and electrically coupled to the integrated circuit board 300. The magnetic induction circuit 110 may be coupled to the helmet 720 in any suitable location. In an exemplary embodiment, according to various aspects of the present technology, the magnetic induction circuit 110 may be a Powermat® receiver incorporated into the helmet 720 at any suitable location and electrically coupled to the integrated circuit board 300 through the power circuit 106. The magnetic field may be provided by the Powermat®. In an exemplary embodiment, the magnetic induction circuit 110 may be a Freescale® receiver incorporated into the helmet 720 at any suitable location and electrically coupled to the integrated circuit board 300 through the power circuit 106. The magnetic field may be provided by the Freescale® transmitter mat.

In an exemplary embodiment, according to various aspects of the present technology, the power source 106 of the helmet 720 may be configured to be rechargeable by USB charging. For example, the USB charging may comprise MicroUSB charging. The Micro-USB may comprise a USB connector including a host interface receptacle and a cable plug (not shown). The cable plug may be compatible with connection, data transmission and/or power supply applications. The Micro-USB may use any standard communication protocol. The Micro-USB may be electrically coupled directly onto or be separate and electrically coupled to the integrated circuit board 300. The Micro-USB may be coupled to the helmet 720 in any suitable location. In an exemplary embodiment, according to various aspects of the present technology, the Micro-USB may comprise a USB connector incorporated into the helmet 720 at any suitable location and electrically coupled to the integrated circuit board 300 through the power circuit 106. Power supply may comprise use of a standard physical connection, for example, a Micro-USB compatible charger cable and a wall transformer.

Figure 8:
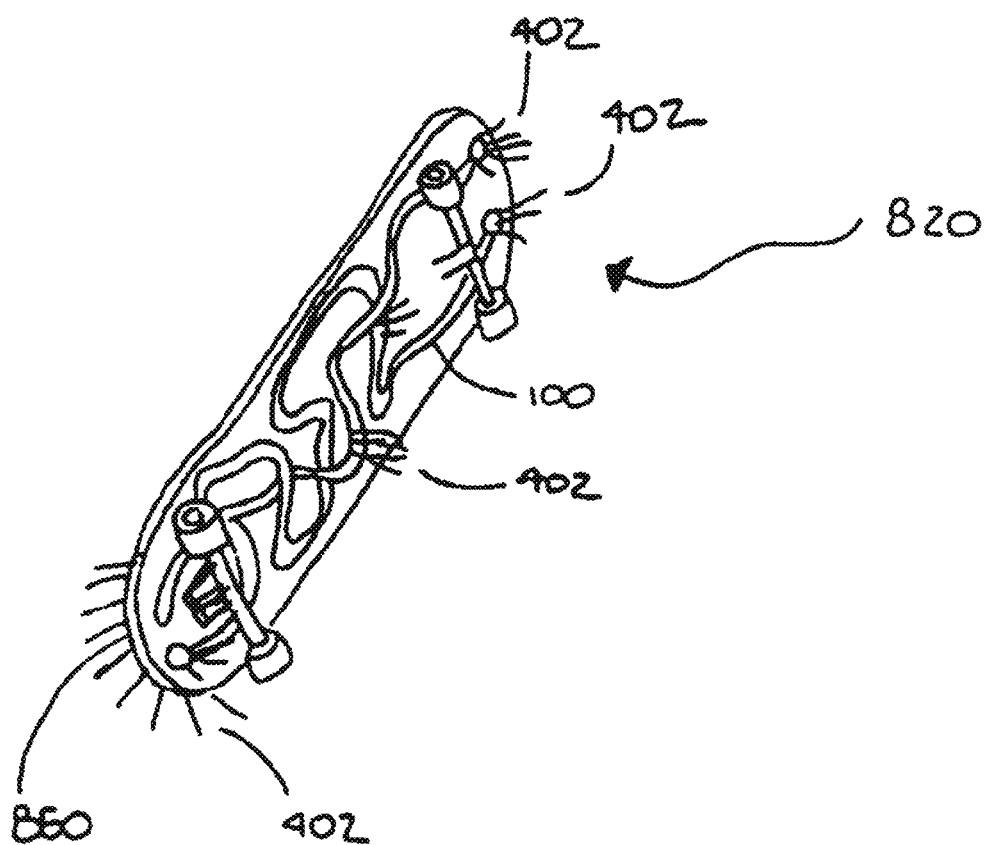
FIG. 8 representatively illustrates an exemplary embodiment of a boardsport medium coupled to a luminescent display system where a light source is embedded within a transmissive material at a forward end of the boardsport medium.

In various embodiments, according to various aspects of the present technology, as shown in FIG. 8, the object 120 may comprise a skateboard 820. The skateboard 820 may comprise any conventional skateboard. The components of the luminescent display system 100 may be coupled to the skateboard 820 in any suitable manner such that light 402 emitted from the light source 102 may be viewed from an outer surface of the skateboard 820. For example, the light source 102 may be located at any one or more of the top, bottom, center, front, back, or near a structurally reinforced portion of the skateboard deck.

In one embodiment, according to various aspects of the present technology, the light source 102 may be embedded at an end 830 of the skateboard 820. For example, referring to FIG. 8, the light source 102 may comprise a headlight 850. In another embodiment, the light source 102 may comprise a taillight (not shown). In another embodiment, the light source 102 may comprise an undercarriage light (not shown). In another embodiment, the light source 102 may comprise a sidelight (not shown). In various embodiments, the at least one of electronic images and/or light emitted from the light source 102 may be displayed from one, multiple or all surfaces of the skateboard while separately or simultaneously functioning as a headlight, tail light, undercarriage light and/or sidelight.

Figure 9:
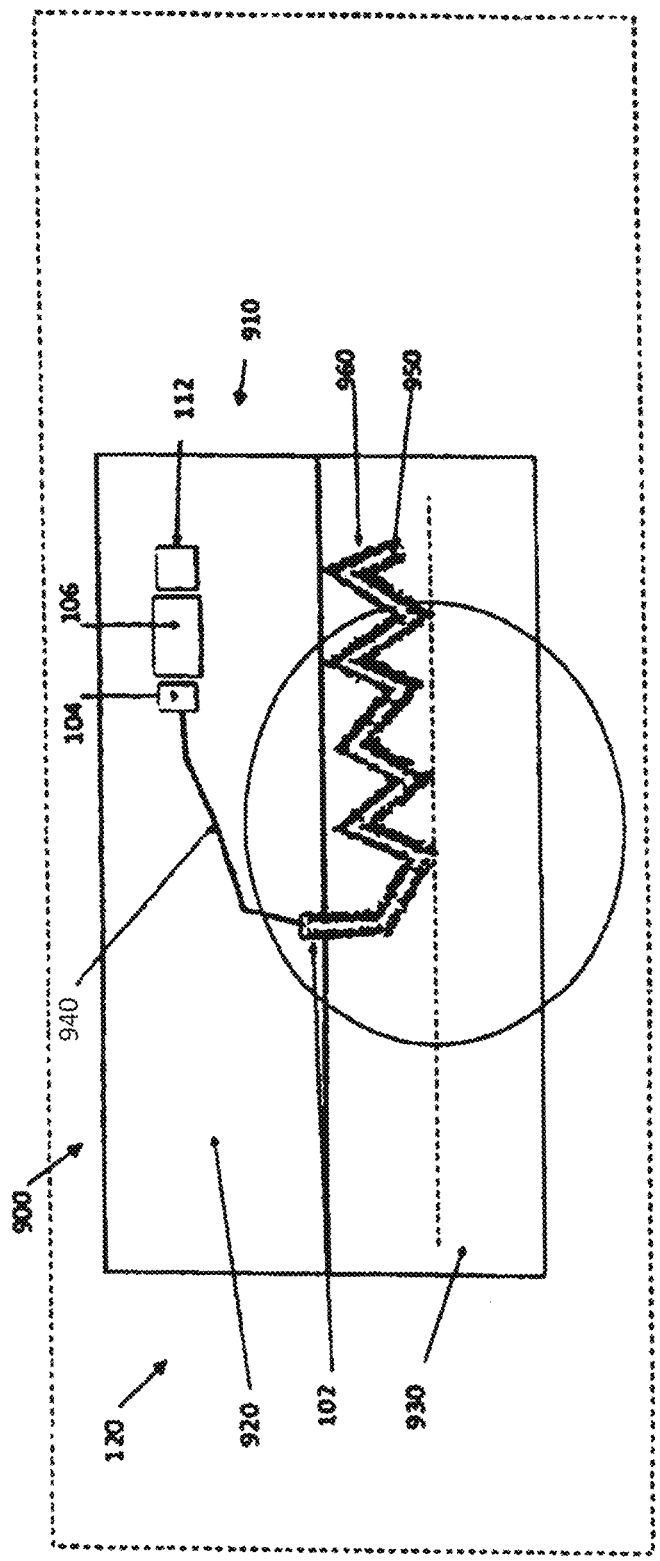
FIG. 9 representatively illustrates an exemplary embodiment of a boardsport medium coupled to a luminescent display system where a light source is embedded within a transmissive material in a side of the boardsport medium.

In one embodiment, shown in FIG. 9, the luminescent display system 100 may comprise a luminescent display system 900, which is shown in an object 120 comprising a snowboard 910. While shown in a snowboard 910, the luminescent display system 900 may be utilized with any object 120. In one embodiment, according to various aspects of the present technology, the snowboard 910 may comprise a core 920 and a sidewall 930. The snowboard 910 may comprise any conventional snowboard. The components of the luminescent display system 900 may be coupled to the snowboard 910 in any suitable manner such that light emitted from the light source 102 may be viewed from an outer surface of the snowboard 910.

Referring again to FIG. 9, the integrated circuit board 104, the power source 106, and the power conduit 112 are shown embedded in the core 920 of the snowboard 910. It should be understood that while not shown, any of the other components of the luminescent display system 100 discussed above may be utilized and integrated with luminescent display system 900.

The light source 102 is shown coupled to the circuit board 104 of luminescent display system 900 by a wire 940. The light source 102 may be coupled to the circuit board 104 of luminescent display system 900 by any known or contemplated manner. In various embodiments, the light source 102 may comprise a fiber optic light source 950. The fiber optic light source 950 may comprise a fiber optic cable and an LED. The fiber optic light source 950 may be embedded in a channel 960 in the sidewall 930. In one embodiment, the sidewall 930 may be formed from the transmissive material 114, with the channel 960 and the fiber optic light source 950 embedded therein. The transmissive material 114 may comprise acrylic, polycarbonate and/or thermoplastic polymers, a glass material, an elastomer such as a urethane polymer, biaxially-oriented polyethylene terephthalate material such as Mylar®, and/or a composite or non-composite material of synthetic or organic origin. The transmissive material 114 may comprise one or multiple layers of a single material or multiple layers of different materials having different properties and dimensions to achieve any desired resilient properties and/or optical qualities as discussed in detail above.

Figure 16:
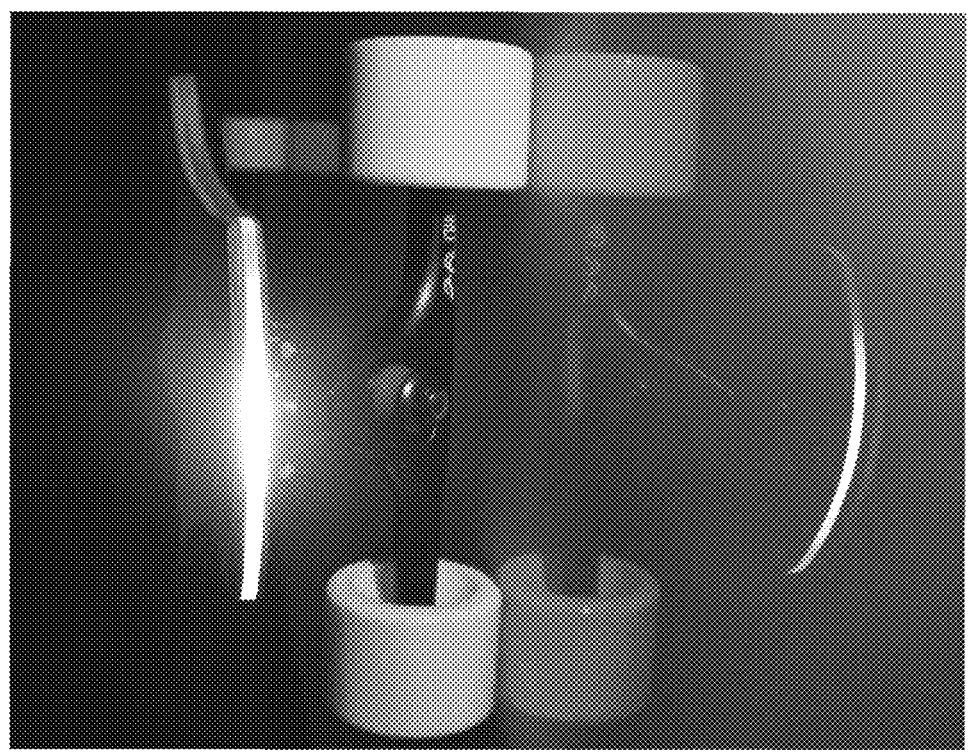
FIG. 16 representatively illustrates an exemplary embodiment of a luminescent display system coupled to a boardsport medium where a light source is embedded within a transmissive material at a forward end of the boardsport medium.
Figure 17:
FIG. 17 representatively illustrates an exemplary embodiment of a luminescent display system coupled to a boardsport medium where a light source is embedded within a transmissive material at a forward end of the boardsport medium.
Figure 18:
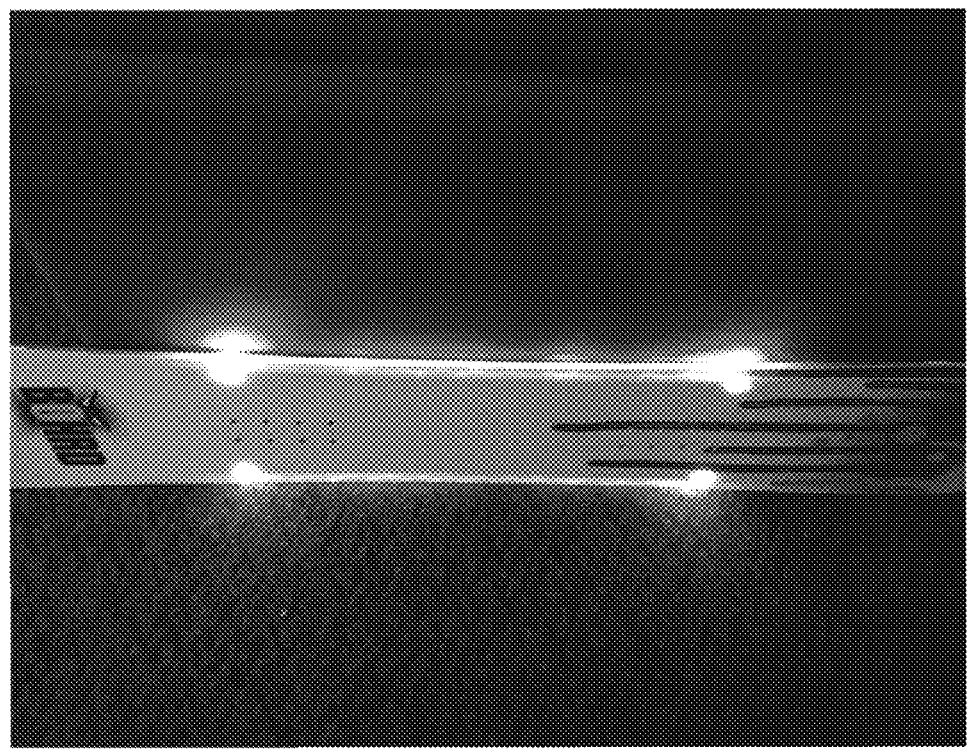
FIG. 18 representatively illustrates an exemplary embodiment of a luminescent display system coupled to a boardsport medium where a light source is embedded within a transmissive material in the sidewalls of the boardsport medium.

The channel 960 may be formed in the sidewall 930 by any known method. The channel 960 comprises a radius similar to the radius of the fiber optic light source 950, thereby protecting the fiber optic cable 950 from damage. In one embodiment, the fiber optic light source 950 may be bent to create a "hot spot," which provides increased illumination of the transmissive material 114 of the sidewall 930. FIGS. 16-18 illustrate light being emitted from the front, rear and sidewall portion of a boardsport as discussed in detail above.

Figure 10:
FIG. 10 representatively illustrates an exemplary embodiment of a luminescent display system coupled to a protective article where a light source is embedded within a transmissive material in a front side of the protective article.
Figure 11:
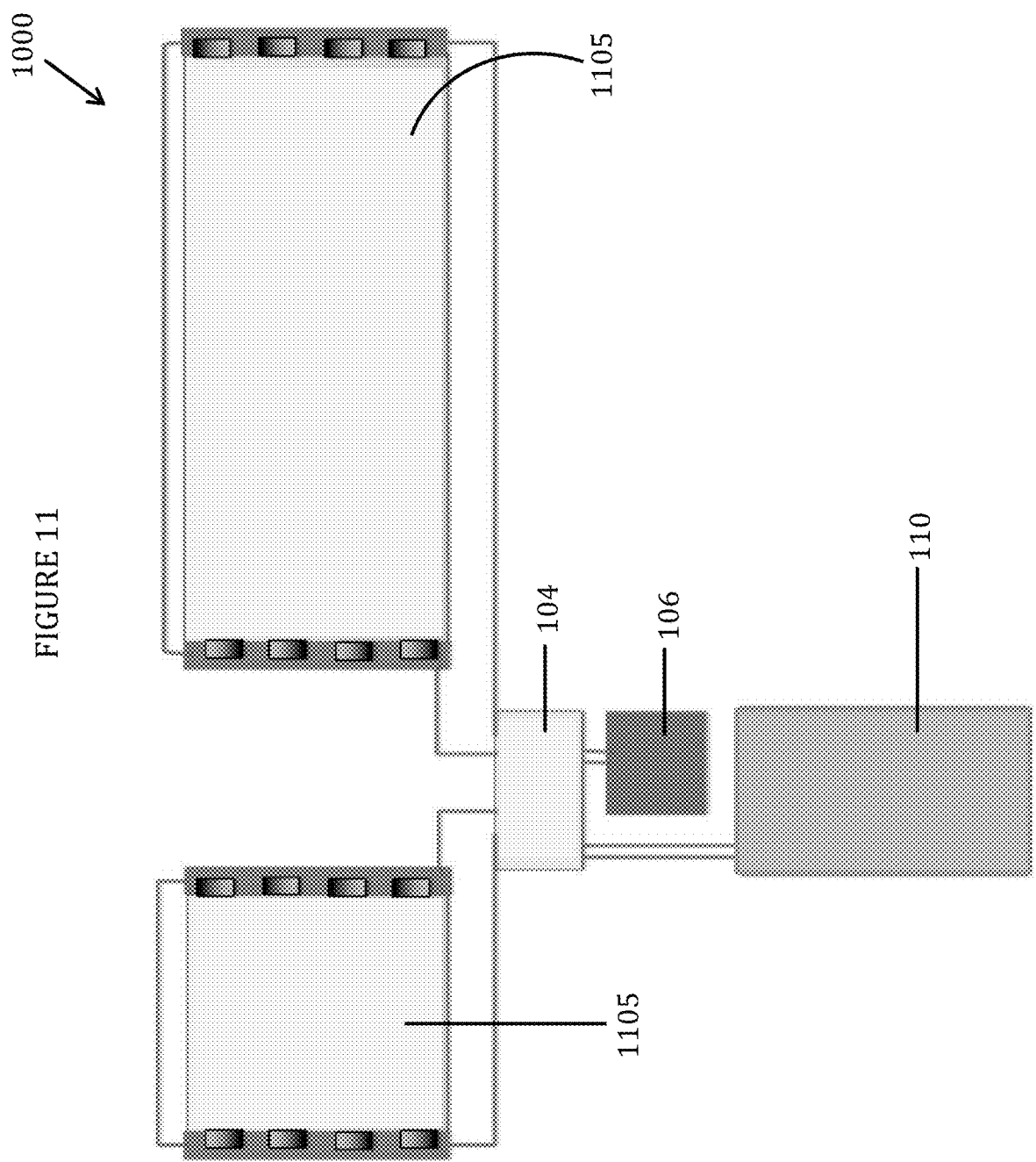
FIG. 11 representatively illustrates a schematic of an exemplary embodiment of a luminescent display system.

In various embodiments, according to various aspects of the present technology, shown in FIGS. 10 and 11, the luminescent display system 100 may comprise a luminescent display system 1000, which is shown in an object 120 comprising a protective article 1005. The protective article 1005, while shown as a shirt, may comprise any type of body protective clothing, including helmets, chest protectors, jackets or shirts for running, biking, off-road and street motorcycle riding, law enforcement apparel, construction worker apparel, airport worker apparel, and the like. The protective article 1005 may also comprise scuba apparel, wetsuits, pet apparel, equine saddles, shoes, and any type of exercise clothing. In one embodiment, the object 120 may comprise a patch or sticker that can be applied to the any medium, including various types of protective articles, clothing, etc. as described above.

In various embodiments, according to various aspects of the present technology, the components of the luminescent display system 1000 may be coupled to the protective article 1005 in any suitable manner such that light emitted therefrom may be viewed from an outer surface of the protective article 1005. The components of the luminescent display system 1000 may be sealed within a cavity composed of layers of component material of the protective article 1005.

In various embodiments, according to various aspects of the present technology, the luminescent display system 1000 may comprise a light panel 1105, the integrated circuit board 104, the power source 106, and the magnetic induction circuit 110, each of which are embedded or otherwise sealed within the component material of the protective article 1005 and electrically coupled by wires or any suitable coupling arrangement. The luminescent display system 1000 components may be electrically coupled by insulated thin gauge conductive wiring, conductive thread with protective coating, conductive thread embedded between two layers of component material or any other method contemplated or described herein. In one embodiment, the component material may comprise an insulative material, such as fabric, and the like. In an exemplary embodiment, the components of the luminescent display system 1000 may be interconnected by conductive thread or wires, which are embedded within layers of sealing component material comprising polyurethane, polyester, TPU film and any combination thereof.

In various embodiments, according to various aspects of the present technology, the luminescent display system 1000 may be sealed within component materials that are resistant to moisture, water, and other environmental elements. Some examples of sealing component material include polyurethane, polyester, TPU film and the like. For example, transparent polyester may be used on the light emitting surface of the light panel 1105 of the luminescent display system 1000 while a TPU film is used on the back side of the light panel 1105. In another embodiment, the luminescent display system 1000 may be sandwiched between layers of component material comprising polyester and/or TPU film.

In an exemplary embodiment of the present technology, the light panel 1105, the integrated circuit board 104, the power source 106, and the magnetic induction circuit 110 may be coated with a polyurethane covering to further resist wear from the environmental conditions. Additionally, it should be understood that while not shown, any of the other components of the luminescent display system 100 discussed above may be utilized and integrated with luminescent display system 1000.

In an exemplary embodiment according to various aspects of the present technology, the light panel 1105 of the luminescent display system 1000 may comprise a pair of light panels, which may be coupled, for example, to the front and back of the protective article 1005, such as a shirt, jacket, and the like. The components and electrical connectors of the luminescent display system 1000 are the same as described above and below and may be oriented similarly within the protective article 1005. The use of multiple light panels and interconnectivity allows for multiple areas of the protective article 1005 to be illuminated in different ways.

The power source 106 may be indirectly recharged by electromagnetic induction in by the magnetic induction circuit 110 that is connected to the power source 106. The power source 106 may be configured to be rechargeable by USB charging. The magnetic induction circuit 110 may be electrically coupled directly onto or be separate from and electrically coupled to the integrated circuit board 104. The magnetic induction circuit 110 may be embedded or otherwise sealed within the protective article 1005 in any suitable location. In an exemplary embodiment, the magnetic induction circuit 110 may be a Powermat® receiver incorporated into the protective article 1005 at any suitable location and electrically coupled to the power source 106 through the integrated circuit board 104. The magnetic field may be provided by the Powermat®. In an exemplary embodiment, the magnetic induction circuit 110 may be a Freescale receiver incorporated into the protective article 1005 at any suitable location and electrically coupled to the power source 106 through the integrated circuit board 104. The magnetic field may be provided by a Freescale transmitter mat.

Figure 12A:
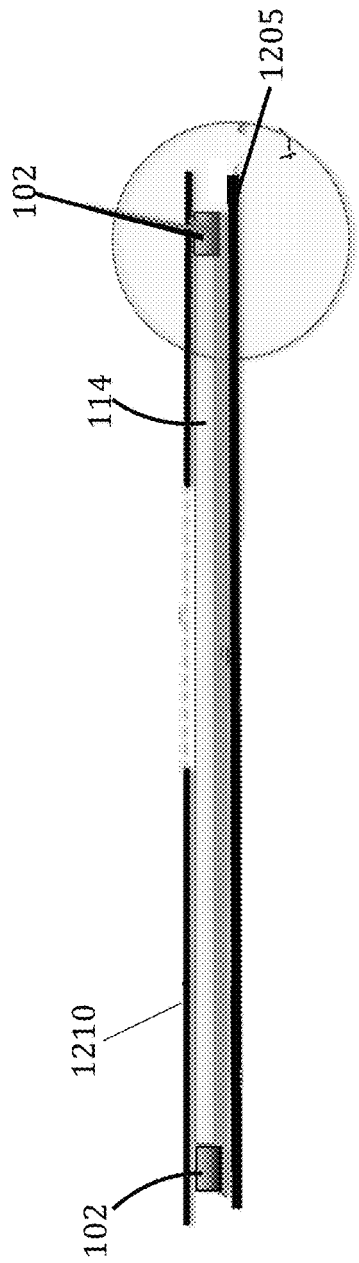
FIG. 12A representatively illustrates an exemplary embodiment of a light panel and 12B representatively illustrates an enlarged portion of FIG. 12A.
Figure 12B:
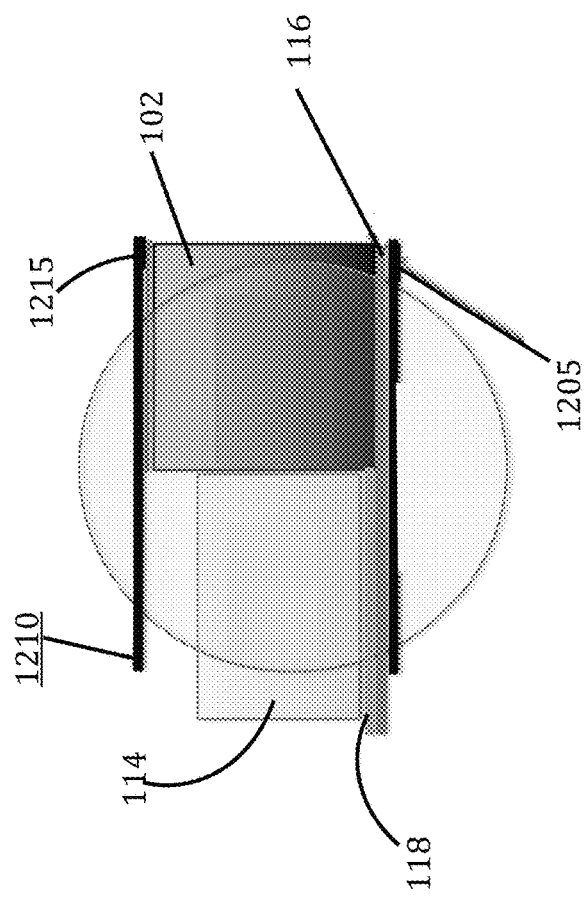
Figure 13A:
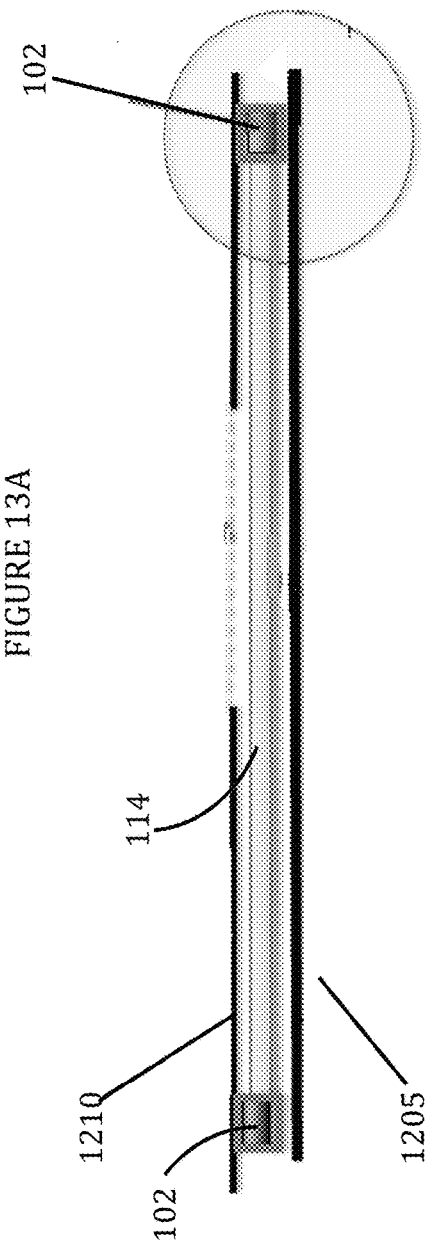
FIG. 13A representatively illustrates an additional exemplary embodiment of a light panel and 13B representatively illustrates an enlarged portion of FIG. 13A.
Figure 13B:
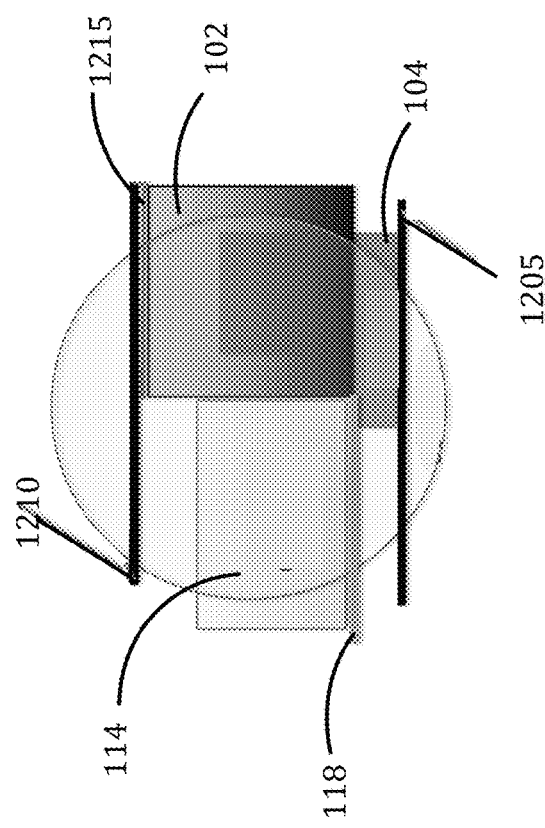

Referring to FIGS. 12A and 12B, in accordance with various embodiments of the present technology, the light panel 1105 may be orientated substantially flush with the outer surface of the protective article 1005. The light panel 1105 may comprise the light source 102 and the transmissive material 114, which are embedded between the interior layer of component material 1205 and the exterior layer of component material 1210 of the protective article 1005. In an alternative embodiment the light panel 1105 may be sealed with 2 layers of material and affixed to the outer surface of the protective article 1005.

In one embodiment, in accordance with various embodiments of the present technology, the light panel 1105 may comprise the transmissive material 114 extending extend between a pair of light sources 102. In one embodiment, the prismatic film 118 may be applied to the transmissive material 114 proximate the interior layer of material to maximize the brightness of the light emitted from the light source 102 through the transmissive material 114, such as by increasing the efficiency of backlighting.

In another embodiment, in accordance with various embodiments of the present technology, the reflective film 116 may be applied a surface of the transmissive material 114 to at least one of enhance, intensify, diffuse, and/or concentrate light emitted from the light source 102 that is transmitted through the transmissive material 114. The reflective film 116 may direct light from the light source 102 in any suitable direction, such as laterally, upwards, or downwards. For example, the reflective film 116 may be applied to the surface of the transmissive material 114 proximate the interior layer of component material 1205 of the protective article 1005. The light from the light source 102 may reflect off the reflective film 116 to an opposite side of the transmissive material 114 that is substantially flush with the outer surface of the protective article 1005. The reflection of light to the outer surface of the protective article 1005 may intensify the light that is visible from the outer surface of the protective article 1005. A masking material 1215 may be used proximate the light source 102 to prevent light bleed through the fabric, such that the design element remains externally visible. The masking material 1215 may comprise an opaque coating, fabric, paint, tape, and the like.

In an exemplary embodiment, in accordance with various embodiments of the present technology, the integrated circuit board 104, the power source 106, and the magnetic induction circuit 110 may be coupled to the light panel 1105 and sealed between the interior layer of component material 1205 and the exterior layer of component material 1210 of the protective article 1005.

Figure 14:
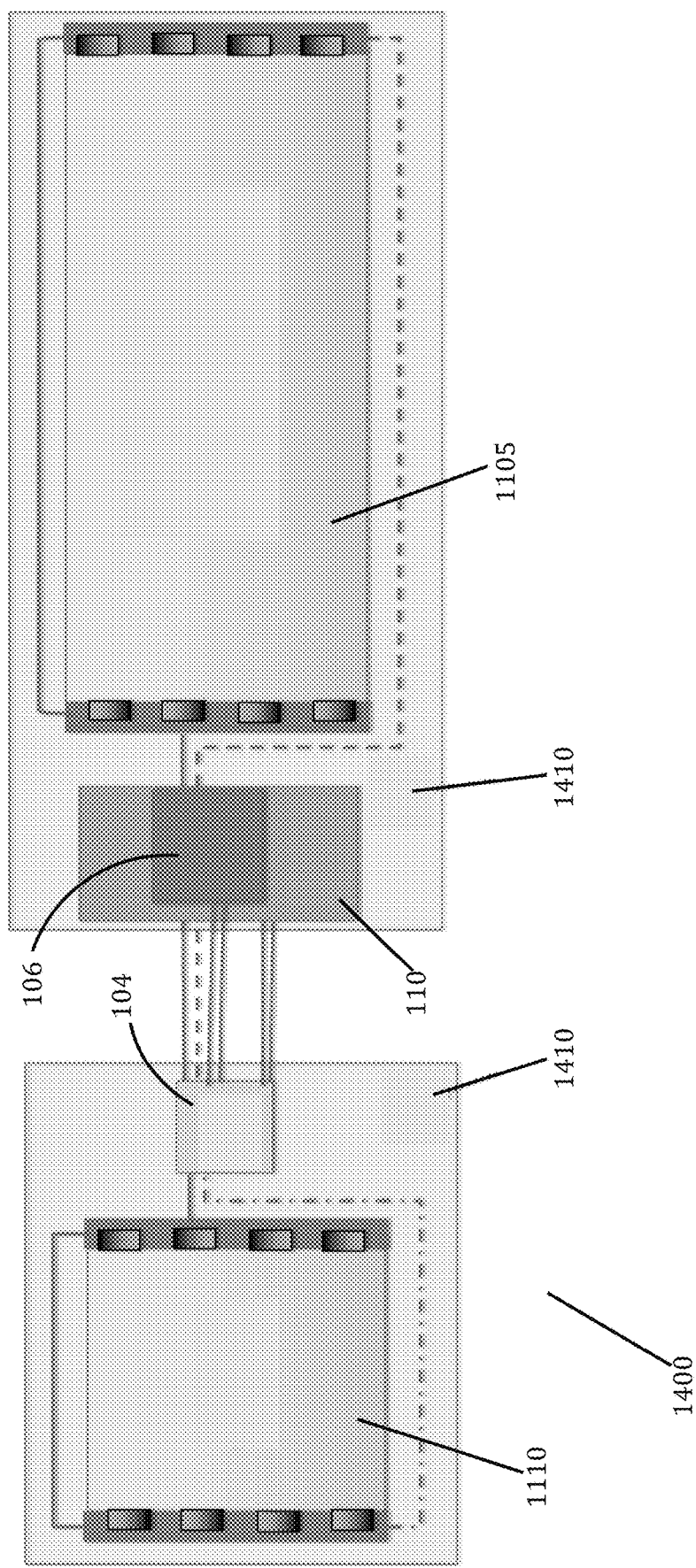
FIG. 14 representatively illustrates a schematic of an additional exemplary embodiment of a luminescent display system.
Figure 15:
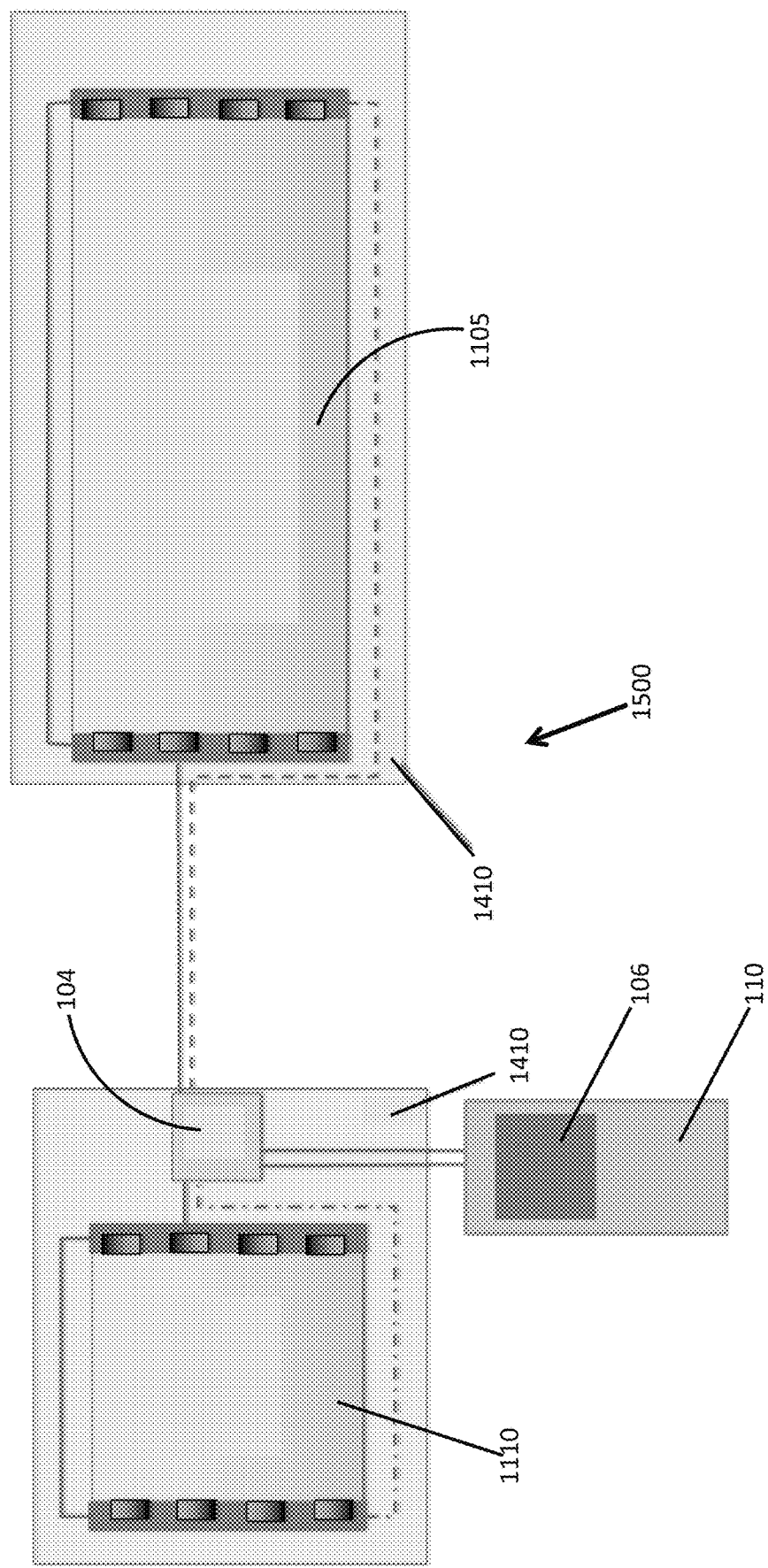
FIG. 15 representatively illustrates a schematic of an additional exemplary embodiment of a luminescent display system.

Referring now to FIG. 14, in one embodiment, in accordance with various embodiments of the present technology, the luminescent display system 1000 may be sealed within a membrane. For, example the membrane may comprise a waterproof membrane, such as, for example, a polyurethane coating. The membrane may comprise 2 layers of component material. The membrane may be at least partially transparent to allow for light transmission from the luminescent display system 1000 to the outer surface of the protective article 1005. In an exemplary embodiment, the first light panel 1105, the power source 106, and the magnetic induction circuit 110 are sealed within a first membrane while the second light panel 1105 and the integrated circuit board 104 are sealed within a second membrane. In another embodiment, shown in FIG. 15, the first light panel 1105 is sealed within a first membrane, the second light panel 1105 and the integrated circuit board 104 are sealed within a second membrane. The power source 106 and the magnetic induction circuit 110 are located remotely within a separate article, such as an arm band. As such the power source 106 and the magnetic induction circuit 110 may be removably coupled to the sealed system and can be removed for recharging. The nature of components of the luminescent display system 1000 allow for adjustability of the locations of the components within the protective article 1005 to achieve an arrangement that is both user friendly and aesthetically pleasing.

In an exemplary embodiment, in accordance with various embodiments of the present technology, the luminescent display system 1000 may comprise a design element, such as design element 1010. The design element 1010 may comprise any suitable material that may provide an artistic or stylized decoration to the protective article 1005 via the luminescent display system 1000. For example, the design element 1010 may comprise a sticker, paint, and/or a material applied to the protective article 1005, such as by screen printing, a heat transfer process, and adhesive, a fastener, a hook and loop closure, and/or a combination thereof. In one embodiment, the design element 1010 may be coupled to the transmissive material 114. In another embodiment, the design element 1010 may be coupled to both the transmissive material 114 and the protective article 1005.

In an exemplary embodiment, in accordance with various embodiments of the present technology, the design element 1010 may cover a surface of the protective article 1005, such as a front surface and/or a back surface. The design element 1010 may comprise cut-out portions, translucent colored portions, or a screen printed mesh-type of material to allow the light to show through the design element 1010. For example, the light may show through the design element 1010 as a cut-out pattern in any shape to provide an artistic decoration, such as company logo, name, insignia, or any other contemplated design.

In an exemplary embodiment of the present technology, the transmissive material 114 may comprise an acrylic material. In one embodiment, the acrylic material may be translucent, opaque, tinted, and/or colored. In another embodiment, the acrylic material may be smooth and/or may have surface texture, such as patterned indentations, that may provide a desired optical property such as enhancing the light output through the transmissive material 114. The acrylic material may provide visual effects when coupled to the light source 102. In an exemplary embodiment, the acrylic transmissive material 114 may comprise a Clarex® cast cell acrylic sheet from Astra Products, Inc. In an exemplary embodiment, the transmissive material 114 may be a flexible acrylic sheet made from Lumitex® and selectively etched to control areas of illumination to improve light patterns and emission. In an exemplary embodiment, the transmissive material 114 may be a polyurethane material with a texturized surface on the outer surface to refract light and a reflective film on the inner surface to improve light refraction and uniformity.

The luminescent display system 100 may be coupled to the object 120 in any suitable manner. For example, the luminescent display system 100 may be bonded, glued with an adhesive, welded, embedded, and/or attached mechanically with a fastener such as bolt and/or screws. In one embodiment, one or more components of the luminescent display system 100 may be coupled to or sandwiched between one or more layers of the component material of the object 120, such as during the manufacturing of the object 120. In another embodiment, one or more components of the luminescent display system 100, such as the transmissive material 114, may be coupled within a cavity, space, or indentation of the object 120 during the manufacturing of the object 120 such that it may be visible from more than one direction, view, or surface of the object 120. In another embodiment, the transmissive material 114, such as acrylic, may be attached into a recessed cavity of the object 120 that may be carved from the object 120.

Figure 4A:
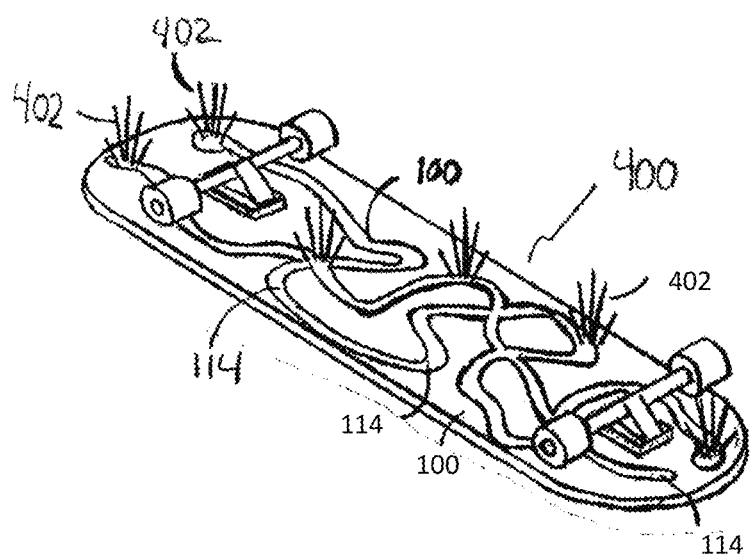
FIGS. 4A-4B representatively illustrate an exemplary embodiment of a boardsport medium coupled to a luminescent display system.
Figure 4B:
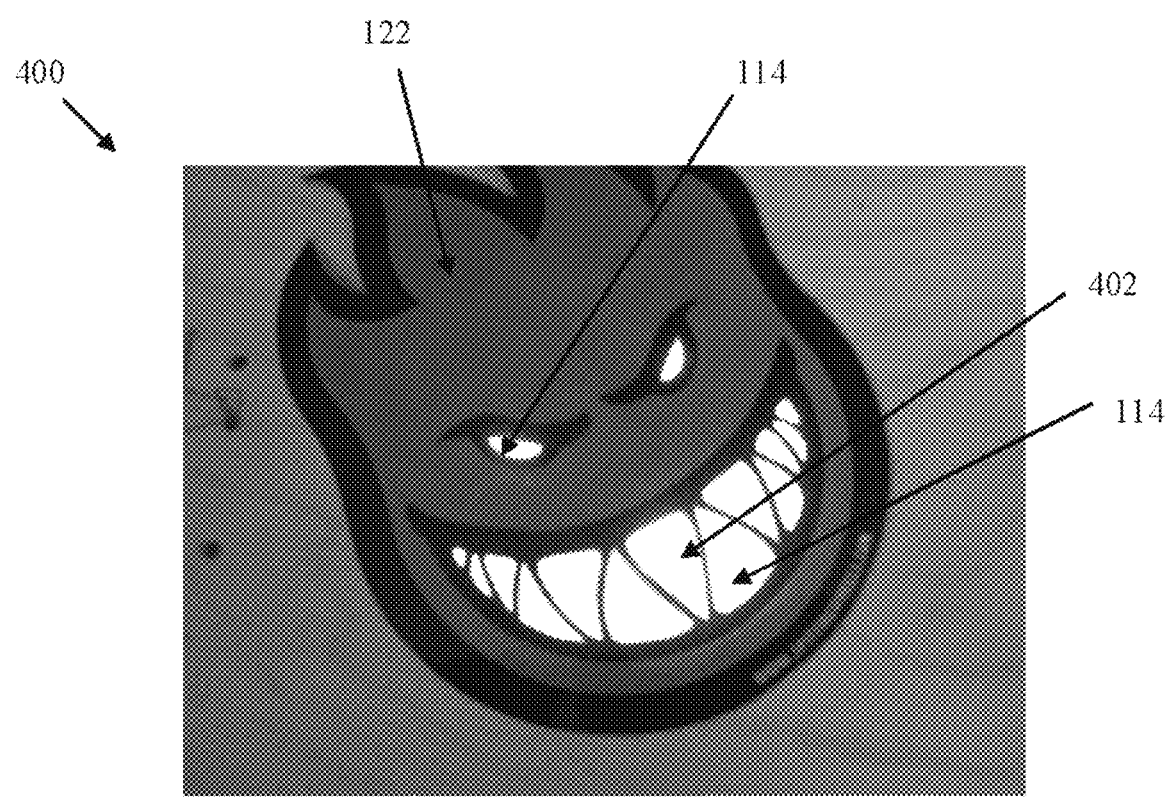

In an exemplary embodiment of the present technology, referring to FIGS. 4A-4B, the luminescent display system 100 may emit light 402 while coupled to the object 120, such as a skateboard deck 400 or snowboard base (not shown). In various embodiments, the luminescent display system 100 may be implemented within or at the surface of the skateboard deck 400 or snowboard base, such that light may be emitted from the top or bottom of the skateboard deck 400. The skateboard deck 400 or snowboard base may comprise any suitable component material. For example, the component material may comprise a plurality of layers of wood veneer adhered together with an adhesive, such as a glue, wherein the adhered wood veneer layers may be molded into a shape for the skateboard deck 400, such as using a pressurized mold. In one embodiment, the component material may comprise a plurality of layers wood veneers, solid wood, plywood, particle board, metal, metal alloys, fiberglass, plastic, composite material of organic origin, composite of synthetic origin, a composite consisting of materials of both organic and synthetic origin, fabric, nylon and/or polybutylene terephthalate (PBT) materials. In another embodiment, the snowboard base or core may comprise a plurality of layers of component material such as at least one of a wood center or core, fiberglass, composite material, acrylic, metal such as steel, and polymer material.

In an exemplary embodiment of the present technology, the luminescent display system 100 may comprise a design element, such as design element 122. The design element 122 may comprise any suitable material that may provide an artistic or stylized decoration to the luminescent display system 100. For example, the design element 122 may comprise a sticker, paint, and/or a material applied to the object 120, such as by screen printing, a heat transfer process, and adhesive, a fastener, a hook and loop closure, and/or a combination thereof. In one embodiment, the design element 122 may be coupled to the transmissive material 114. In another embodiment, the design element 122 may be coupled to both the transmissive material 114 and the object 120.

In an exemplary embodiment, the design element 122 may cover a surface of the skateboard deck 400, such as a bottom surface and/or a top surface. The design element 122 may comprise cut-out portions, translucent colored portions, or a screen printed mesh-type of material to allow the luminescence 402 to show through the design element 122. For example, the luminescence 402 may show through the design element 122 as a cut-out pattern in any shape to provide an artistic decoration, such as a skull, snake, face, animal, winding path, or flames.

FIG. 5 illustrates an exemplary method of manufacturing a representative embodiment the present technology (500). A method of manufacturing a luminescent display system, such as the luminescent display system 100, according to various aspects of the present technology, may comprise electrically coupling components to an integrated circuit board comprising the microcontroller 302. The components may comprise the motion sensor 312, the memory storage device, and the battery charger 310 (502). The light source 102 and the power source 106 may be electrically coupled to the integrated circuit board (504, 506). The integrated circuit board 104, the light source 102, and the power source 106 may then be embedded within the object 120 such that the light source 102 is configured to be proximate to the cavity or the layers of component material where the transmissive material 114 (508) will be located. The integrated circuit board 104, the light source 102, and the power source 106 may be disposed between any two layers of component material during the manufacturing process for creating the object 120, such as between the layers of wood veneer of a skateboard deck, the layers of plastic of a snowboard base or between layers of component material on a protective article. The transmissive material 114 may be secured into the cavity of the object during manufacturing such that a surface of the transmissive material 114 is configured to be substantially flush with an outer surface of the object, creating a viewing window where the light emitted from the light source 102 may be visible from the outer surface of the object (510). The light source 102 may be activated by the microcontroller 302 in response to a signal, such as a change in acceleration of the object as detected by the motion sensor 312 (512). The light emitted from the light source 102 upon activation may be viewed from an outer surface of the object (514).

FIG. 6 illustrates another exemplary method of manufacturing a representative embodiment the present technology (600). A method of manufacturing a luminescent display system, such as the luminescent display system 100, according to various aspects of the present technology, may comprise coupling components to an integrated circuit board comprising the microcontroller 302. The components may comprise the motion sensor 312, the memory storage device, and the battery charger 310 (602). The light source 102 may be electrically coupled to a power conduit 112 and embedded within the transmissive material 114 such that the power conduit 112 extends from the embedded light source 102 and outward from the transmissive material 114 for electrically coupling to the integrated circuit board 104 (604). The power source 106 may be electrically coupled to the integrated circuit board (606). The integrated circuit board 104 and the power source 106 may then be embedded within the object (608). The integrated circuit board 104 and the power source 106 may be disposed between any two layers of material during the manufacturing process for creating the object 120, such as between the layers of wood veneer of a skateboard deck, between the layers of plastic of a snowboard base, within the core of a snowboard or between layers of component material on a protective article. The transmissive material 114 with the embedded light source 102 may be secured into the cavity of the object 120 during manufacturing such that a surface of the transmissive material 114 is configured to be substantially flush with an outer surface of the object, creating a viewing window where the light emitted from the light source 102 may be visible from the outer surface of the object (610). The light source 102 may be activated by the microcontroller 302 in response to a signal, such as a change in acceleration of the object as detected by the motion sensor 312 (612). The light emitted from the light source 102 upon activation may be viewed from an outer surface of the object (614).

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages, and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition, system, or apparatus that comprises a list of elements does not include only those elements recited, but may also include other elements not expressly listed or inherent to such process, method, article, composition, system, or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A luminescent display system for displaying at least one of an electronic image and light from an article of wearable clothing for visibility enhancement comprising:
  a flexible transmissive material disposed within the article of wearable clothing, wherein a first surface of the transmissive material is configured to be positioned substantially flush with an outer surface of the article of clothing, wherein the flexible material conforms with the shape of the article of wearable clothing when in use;
  a light source completely sealed within the article of wearable clothing and configured to emit light through the transmissive material; and
  an integrated circuit board completely sealed within the article of wearable clothing and electrically coupled to the light source by a power conduit;
  a control system completely sealed within the article of wearable clothing and electrically coupled onto the integrated circuit board, wherein the control system comprises:
    a microcontroller configured to control the emission of light from the light source in response to a signal;

an indirect activation system comprising an internal switch completely sealed within the article of wearable clothing and configured to provide the signal to the microcontroller according to a switching action of the switch;

a motion sensor completely sealed within the article of wearable clothing and electrically coupled onto the integrated circuit board; and a memory storage device completely sealed within the article of wearable clothing and electrically coupled onto the integrated circuit board; and an indirectly rechargeable power source completely sealed within the article of wearable clothing and coupled to the integrated circuit board.

2. The luminescent display system according to claim 1, wherein the indirectly rechargeable power source is coupled to the integrated circuit board and configured to provide power to at least one of the light source, the motion sensor, the memory storage device, and the control system.

3. The luminescent display system according to claim 2, wherein the wearable article of clothing is at least one of a conventional shirt or jacket, wherein the shirt or jacket comprise a plurality of layers of fabric material.

4. The luminescent display system according to claim 3, wherein the least one of electronic images and/or light may be displayed from a surface of the wearable article of clothing.

5. The luminescent display system according to claim 3, wherein the flexible transmissive material, the integrated circuit board, and the power source are positioned between the layers of fabric of the wearable article of clothing.

6. The luminescent display system according to claim 3, wherein the luminescent display system is configured to illuminate an area of the wearable article of clothing.

7. The luminescent display system of according to claim 1, further comprising a prismatic film applied to at least one surface of the transmissive material.

8. The luminescent display system of according to claim 1, wherein the luminescent display system is configured to change color to indicate at least one or more of location, distance, direction and/or speed.

9. The luminescent display system according to claim 1, further comprising a reflective film applied to an inner surface of the transmissive material, wherein the reflective film directs the light emitted through the transmissive material outwardly.

10. The luminescent display system according to claim 1, wherein the transmissive material is selectively etched and configured to control an area of illumination.

11. The luminescent display system for displaying at least one of an electronic image and light from a wearable object for visibility enhancement comprising:

a flexible transmissive material disposed within a portion of the wearable object, wherein a first surface of the transmissive material is configured to be positioned substantially flush with an outer surface of the object, wherein the flexible material conforms with the shape of the wearable object when in use;

a light source completely sealed within the wearable object and configured to emit light through the transmissive material;

an integrated circuit board completely sealed within the wearable object and electrically coupled to the light source by a power conduit;

a control system completely sealed within the object and electrically coupled onto the integrated circuit board, wherein the control system comprises:

a microcontroller configured to control the emission of light from the light source in response to a signal; and an indirect activation system comprising an internal switch completely sealed within the wearable object and configured to provide the signal to the microcontroller according to a switching action of the switch;

a motion sensor completely sealed within the wearable object and electrically coupled onto the integrated circuit board; and an indirectly rechargeable power source completely sealed within the wearable object and coupled to the integrated circuit board.

12. The luminescent display system according to claim 11, wherein the indirectly rechargeable power source is configured to provide power to at least one of the light source, the motion sensor, the memory storage device, and the control system.

13. The luminescent display system according to claim 11, wherein the light emitted through the transmissive material is visible from the outside of the wearable object.

14. The luminescent display system according to claim 11, wherein the wearable object is a protective article.

15. The luminescent display system according to claim 14, wherein the luminescent display system is configured to illuminate an area of the helmet medium.

16. The luminescent display system according to claim 14, wherein the protective article is a helmet medium comprising an exterior shell and an inner protective core coupled to the external shell.

17. The luminescent display system according to claim 16, wherein the at least one light source and the transmissive material are embedded in the inner protective core.

18. The luminescent display system according to claim 16, wherein the at least one light source and the transmissive material are embedded in the exterior shell.

19. The luminescent display system according to claim 16, wherein the at least one light source and the transmissive material are configured to substantially cover the area equal to the area of the external shell of the helmet medium.

20. The luminescent display system according to claim 11, wherein the at least one light source and the transmissive material are located at least one of the top, front, back, and/or sides of the object.

21. The luminescent display system of according to claim 11, wherein the luminescent display system is configured to indicate at least one or more of location, distance, direction and/or speed.

22. The luminescent display system of according to claim 11, wherein the luminescent display system is configured to change color to indicate at least one or more of location, distance, direction and/or speed.

23. The luminescent display system according to claim 11, wherein the luminescent display system is configured illuminate environmental surroundings.

* * * * *